United States Patent [19]
Spielman et al.

[11] Patent Number: 5,790,854
[45] Date of Patent: Aug. 4, 1998

[54] EFFICIENT STACK UTILIZATION FOR COMPILING AND EXECUTING NESTED IF-ELSE CONSTRUCTS IN A VECTOR DATA PROCESSING SYSTEM

[75] Inventors: Jason Spielman; Yee-Wei Huang, both of Austin; Michael G. Gallup, deceased, late of Austin, by Linda Gallup, executrix; Robert W. Seaton, Jr.; L. Rodney Goke, both of Austin, all of Tex.

[73] Assignee: Motorola Inc., Schaumburg, Ill.

[21] Appl. No.: 510,948

[22] Filed: Aug. 3, 1995

Related U.S. Application Data

[63] Continuation-in-part of Ser. No. 40,779, Mar. 31, 1993, Pat. No. 5,717,947.

[51] Int. Cl.$^6$ .................. G06F 15/16; G06F 17/16
[52] U.S. Cl. .................. 395/701; 395/709; 395/804; 395/805; 395/806; 395/807; 395/808; 395/809
[58] Field of Search .................. 395/562–563, 395/800.02, 800.03, 800.07, 800.04, 800.09, 800.06, 800.05, 800.22, 581, 379, 383–384, 701, 708, 709; 364/736.01, 736.03; 711/147

[56] References Cited

U.S. PATENT DOCUMENTS

| | | | |
|---|---|---|---|
| 3,287,703 | 11/1966 | Slotnick | 340/172.5 |
| 3,796,992 | 3/1974 | Nakamura et al. | 370/447 |
| 4,463,445 | 7/1984 | Grimes | 395/296 |
| 4,470,112 | 9/1984 | Dimmick | 395/296 |
| 4,488,218 | 12/1984 | Grimes | 395/296 |
| 4,809,169 | 2/1989 | Sfarti et al. | 364/200 |
| 5,043,867 | 8/1991 | Bhandarkar et al. | 395/563 |
| 5,045,995 | 9/1991 | Levinthal et al. | 395/583 |
| 5,067,095 | 11/1991 | Peterson et al. | 395/24 |
| 5,073,867 | 12/1991 | Murphy et al. | 395/27 |
| 5,083,285 | 1/1992 | Shima et al. | 395/24 |
| 5,086,405 | 2/1992 | Chung et al. | 364/748.11 |
| 5,140,523 | 8/1992 | Frankel et al. | 364/420 |
| 5,140,530 | 8/1992 | Guha et al. | 395/13 |
| 5,140,670 | 8/1992 | Chua et al. | 395/24 |
| 5,146,420 | 9/1992 | Vassiliadis et al. | 364/757 |
| 5,148,515 | 9/1992 | Vassiliadis et al. | 395/27 |
| 5,150,327 | 9/1992 | Matsushima et al. | 365/189 |
| 5,150,328 | 9/1992 | Aichelmann, Jr. | 365/189 |
| 5,151,874 | 9/1992 | Jeong et al. | 364/752 |
| 5,151,971 | 9/1992 | Jousselin et al. | 395/27 |
| 5,152,000 | 9/1992 | Hillis | 395/800.11 |
| 5,155,389 | 10/1992 | Furtek | 326/39 |
| 5,155,699 | 10/1992 | Chung et al. | 364/766 |
| 5,165,009 | 11/1992 | Watanabe et al. | 395/27 |
| 5,165,010 | 11/1992 | Masuda et al. | 395/27 |
| 5,167,008 | 11/1992 | Engeler | 395/27 |
| 5,168,573 | 12/1992 | Fossum et al. | 395/800.04 |
| 5,175,858 | 12/1992 | Hammerstrom | 395/800.22 |

(List continued on next page.)

OTHER PUBLICATIONS

Barnes et al. "The ILLIAC IV Computer", IEEE Trans. on Computers, vol. C-17, No. 8, pp. 746–757., Aug. 1968.

(List continued on next page.)

*Primary Examiner*—Emanuel Todd Voeltz
*Assistant Examiner*—Cuong H. Nguyen

[57] ABSTRACT

A computer-implemented method is provided for compiling software code that performs nested conditional constructs in vector data processors (10). A vector bit stack (128) to record which processing elements (16) were activated and which processing elements were deactivated during execution of a nested conditional construct. Subsequently, when an end of a first nested conditional construct is encountered, a state of the processing elements at a point in time in which the first nested conditional construct was initiated may be popped off of the vector bit stack and a second conditional construct or any other operation may be executed. Therefore, conditional constructs may be executed while ensuring the proper state of the processing elements. The compiler program effectively utilizes the vector bit stack to store prior states of each of the processing elements of the vector data processor such that the processing elements may be efficiently restored to a correct intermediate value.

25 Claims, 17 Drawing Sheets

U.S. PATENT DOCUMENTS

| | | | |
|---|---|---|---|
| 5,182,794 | 1/1993 | Gasperi et al. | 395/23 |
| 5,197,030 | 3/1993 | Akaogi et al. | 365/200 |
| 5,197,130 | 3/1993 | Chen et al. | 395/325 |
| 5,208,900 | 5/1993 | Gardner | 395/27 |
| 5,600,811 | 2/1997 | Spielman et al. | 395/563 |
| 5,604,913 | 2/1997 | Koyanagi et al. | 395/800.05 |
| 5,623,650 | 4/1997 | Beard et al. | 395/581 |
| 5,664,134 | 9/1997 | Gallup et al. | 395/800.02 |
| 5,706,488 | 1/1998 | Gallup et al. | 395/564 |
| 5,717,947 | 2/1998 | Gallup et al. | 395/800.03 |

OTHER PUBLICATIONS

Kuck "ILLIAC IV Software and Application Programming" IEEE Trans. on Computers, vol. C-17, No. 8, pp. 758–770., Aug. 1968.

McIntyre "An introduction to the ILLIAC IV computer" from Datamation Magazine, pp. 60–67., Apr. 1970.

Stone, et al. "Introduction to computer architecture—SIMD computers" Science Research Associates, Inc., pp. 327–355., 1975.

Hayes et al. "A Microprocessor–based Hypercube Supercomputer", IEEE Micro, pp. 6–17., 1986.

Wawrzynek, et al. "The Design of a Neuro–Microprocessor", IEEE Trans. on Neural Networks, vol. 4, No. 3, pp. 394–399., May 1993.

Hammerstrom "A VLSI architecture for high–performance, low–cost, on–chip learning" from Adaptive Solutions, Inc., Sect. 1–5., Feb. 28, 1990.

"CNAPS—1064 Digital Neural Processor" published by Adaptive Solutions, Inc. pp. 1–8.

"The Design of a Neuro–Microprocessor", published in IEEE Transactions on Neural Networks, on May 1993, vol. 4, No. 3, ISSN 1045–9227, pp. 394 through 399.

"ILLIAC IV Systems Characteristics and Programming Manual" published by Burroughs Corp. on Jun. 30, 1970, IL4–PM1, Charge No. 1.

"Neural Networks Primer Part I" published in AI Expert in Dec. 1987 and written by Maureen Caudill, pp. 46 through 52.

"Neural Networks Part II" published in AI Expert in Feb. 1988 and written by Maureen Caudill, pp. 55 through 61.

"Neural Networks Primer Part III" published in AI Expert in Jun. 1988 and written by Maureen Caudill, pp. 53 through 59.

"Neural Networks Primer Part IV" published in AI Expert in Aug. 1988 and written by Maureen Caudill, pp. 61 through 67.

"Neural Networks Primer Part V" published in AI Expert in Nov. 1988 and written by Maureen Caudill, pp. 57 through 65.

"Neural Networks Primer Part VI" published in AI Expert in Feb. 1988 and written by Maureen Caudill, pp. 61 through 67.

U.S. application No. 07/600,982, Pettijohn, filed May 5, 1993.

"Neural Networks Primer Part VII" published in AI Expert in May 1989 and written by Maureen Caudill, pp. 51 through 58.

"Neural Networks Primer Part VIII" published in AI Expert in Aug. 1989 and written by Maureen Caudill, pp. 61 through 67.

"Fast Spheres,Shadows,Textures,Transparencies, and Image Enhancements in Pixel Planes" by H. Fuchs et al. and published in Computer Graphics, vol. 19, No. 3, Jul. 1985, pp. 111–120.

U.S. application Serial No. 07/600,784 filed Oct. 22, 1990 by Gardner et al.

U.S. application Ser. No. 07/898,189 filed Jun. 12, 1992 by Gardner et al.

"Pixel Planes: Building a VLSI–Based Graphic System" by J. Poulton et al. and published in the proceedings of the 1985 Chapel Hill Conference on VLSI, pp. 35–60.

"Pixel Planes 5: A Heterogeneous Multiprocessor Graphics System Using Processor–Enhanced Memories" by Fuchs et al. and published in Computer Graphics,vol. 23,No. 3,Jul. 1989, pp. 79–88.

"Parallel Processing in Pixel–Planes, a VLSI logic–enhanced memory for raster graphics" by Fuchs et al. published in the proceedings of ICCD' 85 held in Oct., 1985, pp. 193–197.

"Building a 512×512 Pixel–Planes System" by J. Poulton et al. and published in Advanced Research in VLSI, Proceedings of the 1987 Stanford Conference, pp. 57–71.

"Coarse–grain & fine–grain parallelism in the next generation Pixel–planes graphic sys." by Fuchs et al. and published in Parallel Processing for Computer Vision and Display, pp. 241–253.

"Pixel Planes: A VLSI–Oriented Design for 3–D Raster Graphics" by H. Fuchs et al. and publ. in the proc. of the 7th Canadian Man–Computer Comm. Conference, pp. 343–347.

"The Torus Routing Chip" published in Journal of Distributed Computing, vol. 1, No. 3, 1986, and written by W. Dally et al. pp. 1–17.

"A Microprocessor–based Hypercube Supercomputer" written by J. Hayes et al. and published in IEEE MICRO in Oct. 1986, pp. 6–17.

"ILLIAC IV Software and Application Programming" written by David, J. Kuck and published in IEEE Transactions on Computers, vol. C–17, No. 8, Aug. 1968, pp. 758–770.

"An Introduction to the ILLIAC IV Computer" written by D. McIntyre and published in Datamation, Apr. 1970, pp. 60–67.

"The ILLIAC IV Computer" written by G. Barnes et al. and published in IEEE Transactions on Computers, vol. C–17, No. 8, Aug. 1968, pp. 746–757.

The ILLIAC IV Computer The First Supercomputer written by R. Michael Hord and published by Computer Science Press, pp. 1–69.

MC68000 8–/16–/32– Bit Microproceesor User's Manual, Eigth Edition, pp. 4–1 through 4–4; 4–8 through 4–12.

MC68020 32–Bit Microprocessor User's Manual, Fourth Edition, pp. 3–12 through 3–23.

Introduction to Computer Architecture written by Harold S. Stone et al. and published by Science Research Associates, Inc. in 1975, pp. 326 through 355.

A VLSI Architecture for High–Performance, Low–Cost, On–chip Learning by D. Hammerstrom for Adaptive Solutions, Inc., Feb. 28, 1990, pp. II–537 through II–544.

"CNAPS–1064 Preliminary Data CNAPS–1064 Digital Neural Processor" published by Adaptive Solutions, Inc. pp. 1–8.

DSP56000/DSP56001 Digital Signal Processor User's Manual, Rev. 1, published by Motorola, Inc. pp. 2–9 through 2–14, 5–1 through 5–21, 7–8 through 7–18.

"M-Structures: Ext. a Parallel, Non-strict, Functional Lang. with State" by Barth et al., Comp. Struct. Group Memo 327 (MIT), Mar. 18, 1991, pp. 1-21.

"A Pipelined, Shared Resource MIMD Computer" by B. Smith et al. and published in the Proceedings of the 1978 International Conference on Parallel Processing, pp. 6-8.

M68000 Family Programmer's Reference Manual published by Motorola, Inc. in 1989, pp. 2-71 through 2-78.

"The DSP is being reconfigured" by Chappell Brown and published in Electronic Engineering Times, Monday, Mar. 22, 1993, Issue 738, p. 29.

DSP56000/56001 Digital Signal Processor User's Manual published by Motorola, Inc. pp. 2-4 and 2-5, 4-6 and 4-7.

MC68340 Integrated Processor User's Manual published by Motorola, Inc. in 1990, pp. 6-1 through 6-22.

Transputer Architecture Technical Overview published by INMOS in Sep. 1985.

Product Description of the IMS T414 Transputer published by INMOS in Sep. 1985.

Product Description of the IMS T212 Transputer published in INMOS in Sep. 1985.

Proceedings of the INMOS Transputer Seminar tour conducted in 1986, published in Apr. 1986.

"Control Data STAR-100 Processor Design" written by R.G. Hintz et al. and published in the Innovative Architecture Digest of Papers for Compcom 72 in 1972, pp. 1 through 4.

| TABLE 2.32 VPCR REGISTER BIT DESCRIPTIONS ||
|---|---|
| BIT | DESCRIPTION |
| VX[1:0] | VECTOR ENGINE EXTENSION BIT. THIS BIT IS SET TO THE VALUE OF THE CARRY AND SIGN FROM THE LAST ARITHMETIC OPERATION. THE PRIMARY USE FOR THIS BIT IS TO EXTEND THE PRECISION OF THE ARITHMETIC OPERATION IN THE VECTOR ENGINES. THESE BITS ARE USED TO HOLD EXTENSION INFORMATION FOR MULTI-BYTE OPERATIONS. DEPENDING ON THE INSTRUCTIONS, THESE TWO BITS WILL HAVE DIFFERENT MEANINGS. REFER TO SECTION 2.5.19 DESCRIPTION OF MULTI-BYTE OPERATIONS FOR MORE INFORMATION. |
| VV / VD | THE VECTOR OVERFLOW BIT (VV) AND THE VECTOR OVERFLOW DIRECTION BIT (VD). THESE BITS ARE USED TO INDICATE BOTH THE OCCURRENCE OF OVERFLOW IN THE PREVIOUS VECTOR ARITHMETIC OPERATION, AND, IF OVERFLOW OCCURRED, THE DIRECTION IN WHICH OVERFLOW WAS TAKEN. FOR A MORE COMPLETE DESCRIPTION OF HOW THE VV AND VD BITS ARE SET AND USED, PLEASE SEE A DESCRIPTION OF THE VPCR BITS IN SECTION 2.3.47. |
| VT | TRUE BIT. THIS IS A PROCESSING MASK BIT. WHEN SET IT ALLOWS THE DESTINATION OPERAND OF THE MICROCODE OPERATION TO BE UPDATED (INCLUDING THE VX BIT). WHEN THIS BIT IS CLEARED, THE UPDATE OF THE DESTINATION REGISTER IS BLOCKED. THIS ALLOWS SOME OF THE PROCESSING ELEMENTS TO COMPUTE WHILE OTHERS ESSENTIALLY SIT IDLE. THIS BIT CAN BE MODIFIED BY THE VIF, VELSE, VROTRT, COLMIN, COLMAX, ROWMIN, ROWMAX, LOCMIN, AND LOCMAX INSTRUCTIONS. |
| VH | HISTORY BIT. THIS BIT IS USED IN CONJUNCTION WITH THE VT BIT TO ALLOW THE VELSE-VIF STRUCTURE TO WORK PROPERLY. THIS BIT RECORDS WHETHER OR NOT THIS PROCESSING ELEMENT HAS EVALUATED AN VIF STATEMENT TO BE TRUE. IF THIS BIT IS SET, THE VT BIT WILL NOT BE SET UNTIL AFTER THE EXECUTION OF AN VENDIF INSTRUCTION. THIS BIT CAN BE MODIFIED BY THE VELSE, VROTRH VENDIF AND VROTRH INSTRUCTION. |
| VID | INPUT DATA VALID. IF THIS BIT IS SET, IT INDICATES THAT VALID DATA IS AT THE CORRESPONDING LOCATION IN THE IDR. THAT IS, IF THE VID BIT OF PROCESSING ELEMENT 14 IS SET, THEN THE DATA LOCATED IN IDR[14] IS VALID. OTHERWISE, DATA IN THE IDR IS CONSIDERED INVALID. EACH TIME DATA IS WRITTEN TO THE IDR BY AN EXTERNAL SOURCE, THE CORRESPONDING VID BIT IS SET. ALL VID BITS CAN BE CLEARED USING THE CLEARV INSTRUCTION. |

FIG.5

| TABLE 2.31 VPCR BIT DEFINITIONS ||||||
|---|---|---|---|---|
| BIT POSITION | BIT | DEFINITION | STATE | DESCRIPTION |
| 1:0 | VX[1:0] (104, 105) | VECTOR EXTENSION BIT | | USED TO EXTENDED VECTOR ARITHMETIC OPERATIONS. |
| 2 | VV (106) | VECTOR OVERFLOW BIT | 0 | NO OVERFLOW OCCURRED. |
| | | | 1 | THE PREVIOUS ARITHMETIC OPERATION GENERATED AND OVERFLOW. |
| 3 | VD (108) | VECTOR DIRECTION BIT | 0 | IF AN OVERFLOW OCCURRED, THE OVERFLOW WAS IN THE NEGATIVE DIRECTION. |
| | | | 1 | IF AN OVERFLOW OCCURRED, THE OVERFLOW WAS IN THE POSITIVE DIRECTION. |
| 4 | VT (110) | VECTOR CONDITIONAL TRUE BIT | 0 | SHELF INACTIVE. |
| | | | 1 | SHELF ACTIVE. |
| 5 | VH (112) | VECTOR CONDITIONAL HISTORY BIT | 0 | INDICATES THAT THIS PROCESSING ELEMENT HAS NOT WON A CONDITIONAL STATEMENT SINCE THE LAST VENDIF INSTRUCTION WAS EXECUTED. |
| | | | 1 | INDICATES THAT THIS PROCESSING ELEMENT HAS WON A CONDITIONAL STATEMENT SINCE THE LAST VENDIF INSTRUCTION WAS EXECUTED. |
| 6 | VID (114) | VECTOR INPUT DATA VALID BIT | 0 | CORRESPONDING LOCATION IN INPUT DATA REGISTER (IDR) IS NOT VALID. |
| | | | 1 | CORRESPONDING LOCATION IN INPUT DATA REGISTER (IDR) IS VALID. |

*FIG. 6*

| TABLE 2.48 VPCR VT AND VH BIT NEXT STATE TRANSITION TABLE |||||||
|---|---|---|---|---|---|
| STATE | $Q_{N+1}$ || $Q_N$ || CONDITIONAL |
| | VT | VH | VT | VH | |
| 1 | 0 | 0 | 0 | 0 | VIF IS EXECUTED |
| 2 | 0 | 1 | 0 | 1 | VIF IS EXECUTED |
| 3 | 1 | 0 | 1 | 0 | VIF IS TRUE |
| 4 | 0 | 0 | 1 | 0 | VIF IS FALSE |
| 5 | 1 | 0 | 0 | 0 | VELSE IS EXECUTED |
| 6 | 0 | 1 | 0 | 1 | VELSE IS EXECUTED |
| 7 | 0 | 1 | 1 | 0 | VELSE IS EXECUTED |
| 8 | 1 | 0 | 0 | 0 | VENDIF IS EXECUTED |
| 9 | 1 | 0 | 0 | 1 | VENDIF IS EXECUTED |
| 10 | 1 | 0 | 1 | 0 | VENDIF IS EXECUTED |

*FIG. 7*

| TABLE 3.13 FOUR PROCESSING ELEMENT EXAMPLE | | | | | | | | | | | | |
|---|---|---|---|---|---|---|---|---|---|---|---|---|
| | PE1 | | | PE2 | | | PE3 | | | PE4 | | |
| CODE | VT | VH | STATE | VT | VH | STATE | VT | VH | STATE | VT | VH | STATE |
| OPCODE1 | 1 | 0 | – | 1 | 0 | – | 1 | 0 | – | 1 | 0 | – |
| OPCODE2 | 1 | 0 | – | 1 | 0 | – | 1 | 0 | – | 1 | 0 | – |
| VIFEQ V0, V4 | 1 | 0 | 3 | 1 | 0 | 4 | 1 | 0 | 4 | 1 | 0 | 4 |
| OPCODE3 | 1 | 0 | – | 0 | 0 | – | 0 | 0 | – | 0 | 0 | – |
| VELSE | 1 | 0 | 7 | 0 | 0 | 5 | 0 | 0 | 5 | 0 | 0 | 5 |
| OPCODE4 | 0 | 1 | – | 1 | 0 | – | 1 | 0 | – | 1 | 0 | – |
| VIFEQ V1, V4 | 0 | 1 | 2 | 1 | 0 | 3 | 1 | 0 | 4 | 1 | 0 | 4 |
| OPCODE5 | 0 | 1 | – | 1 | 0 | – | 0 | 0 | – | 0 | 0 | – |
| VELSE | 0 | 1 | 6 | 1 | 0 | 7 | 0 | 0 | 5 | 0 | 0 | 5 |
| OPCODE6 | 0 | 1 | – | 0 | 1 | – | 1 | 0 | – | 1 | 0 | – |
| VIFEQ V2, V4 | 0 | 1 | 2 | 0 | 1 | 2 | 1 | 0 | 3 | 1 | 0 | 4 |
| OPCODE7 | 0 | 1 | – | 0 | 1 | – | 1 | 0 | – | 0 | 0 | – |
| VELSE | 0 | 1 | 6 | 0 | 1 | 6 | 1 | 0 | 7 | 0 | 0 | 5 |
| OPCODE8 | 0 | 1 | – | 0 | 1 | – | 0 | 1 | – | 1 | 0 | – |
| VENDIF | 0 | 1 | 9 | 0 | 1 | 9 | 0 | 1 | 9 | 1 | 0 | 10 |
| OPCODE9 | 1 | 0 | – | 1 | 0 | – | 1 | 0 | – | 1 | 0 | – |

*FIG.8*

| TABLE 3.14 CONTENTS OF PROCESSING ELEMENT REGISTERS | | | | | |
|---|---|---|---|---|---|
| | V0 | V1 | V2 | V3 | V4 |
| PE 1 | 0 | 1 | 1 | 1 | 0 |
| PE 2 | 1 | 0 | 1 | 1 | 0 |
| PE 3 | 1 | 1 | 0 | 1 | 0 |
| PE 4 | 1 | 1 | 1 | 0 | 0 |

*FIG.9*

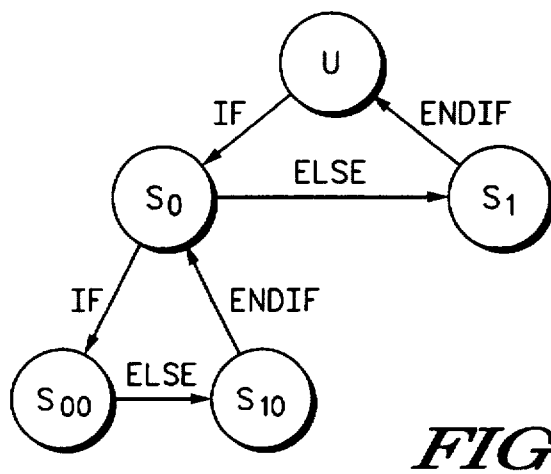
DEPICTED CODE:
IF...                S₀
  IF...        S₀₀
  ELSE...      S₁₀
  ENDIF
ELSE...              S₁
ENDIF
*FIG.14*
| PE | INITIAL STATE | STATE 1, S₀: AFTER IF | STATE 2, S₀₀: AFTER IF | STATE 3, S₁₀: AFTER IF | STATE 4, S₁: AFTER IF |
|---|---|---|---|---|---|
| 0 | 1 | 1 | 0 | 1 | 0 |
| 1 | 1 | 1 | 0 | 1 | 0 |
| 2 | 1 | 1 | 1 | 0 | 0 |
| 3 | 1 | 1 | 1 | 0 | 0 |
| 4 | 1 | 0 | 0 | 0 | 1 |
| 5 | 1 | 0 | 0 | 0 | 1 |
| 6 | 1 | 0 | 0 | 0 | 1 |
*FIG.15*
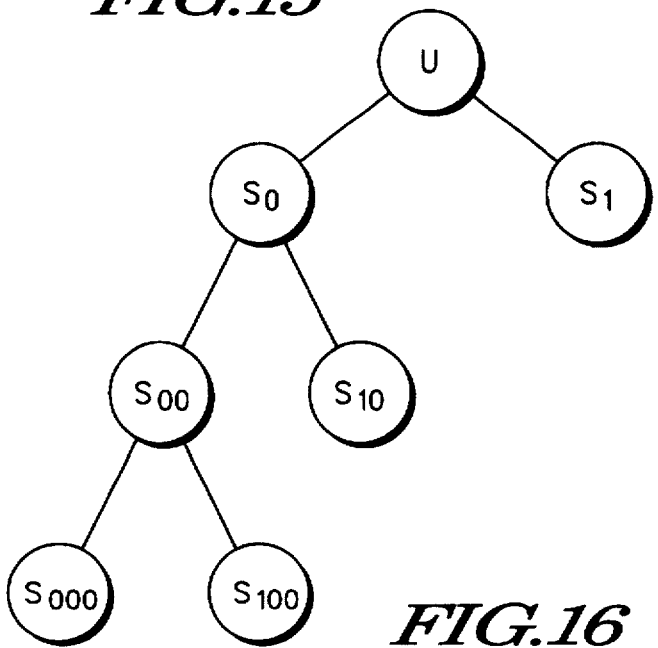
DEPICTED CODE:
IF...                    S₀
  BODY 1
  IF...          S₀₀
    BODY 2
    IF...      S₀₀₀
      BODY 3
    ELSE...    S₁₀₀
      BODY 4
    ENDIF
    BODY 5
  ELSE...        S₁₀
    BODY 6
  ENDIF
  BODY 7
ELSE...                  S₁
  BODY 8
ENDIF
*FIG.16*

| | | | | | ① AFTER: VLSHFTT V0 VIF ... | | | ② AFTER: VLSHFTT V0 VIF ... | | | ③ AFTER: VNMVH V0 VIELSE | | | ④ AFTER: VROTRT V0 VNMVH V0 VELSE | | | ⑤ AFTER: VROTRT V0 | | |
|---|---|---|---|---|---|---|---|---|---|---|---|---|---|---|---|---|---|---|---|
| | U | S0 | S00 S10 | S1 | V0 | VT | VH | V0 | VT | VH | V0 | VT | VH | V0 | VT | VH | V0 | VT | VH |
| PE[0] | 1 | 1 | 1 | 0 | XXXX XXX1 | 1 | 0 | XXXX XX11 | 1 | 0 | XXXX XX11 | 0 | 1 | XXXX XXX1 | 0 | 1 | XXXX XXXX | 1 | 1 |
| PE[1] | 1 | 1 | 1 | 0 | XXXX XXX1 | 1 | 0 | XXXX XX11 | 1 | 0 | XXXX XX11 | 0 | 1 | XXXX XXX1 | 0 | 1 | XXXX XXXX | 1 | 1 |
| PE[2] | 1 | 1 | 0 | 0 | XXXX XXX1 | 1 | 0 | XXXX XX11 | 0 | 0 | XXXX XX11 | 1 | 0 | XXXX XXX1 | 0 | 1 | XXXX XXXX | 1 | 1 |
| PE[3] | 1 | 1 | 0 | 0 | XXXX XXX1 | 1 | 0 | XXXX XX11 | 0 | 0 | XXXX XX11 | 1 | 0 | XXXX XXX1 | 0 | 1 | XXXX XXXX | 1 | 1 |
| PE[4] | 1 | 0 | 0 | 1 | XXXX XXX1 | 0 | 0 | XXXX XX10 | 0 | 0 | XXXX XX10 | 0 | 1 | XXXX XXX1 | 1 | 0 | XXXX XXXX | 1 | 0 |
| PE[5] | 1 | 0 | 0 | 1 | XXXX XXX1 | 0 | 0 | XXXX XX10 | 0 | 0 | XXXX XX10 | 0 | 1 | XXXX XXX1 | 1 | 0 | XXXX XXXX | 1 | 0 |
| PE[6] | 1 | 0 | 0 | 1 | XXXX XXX1 | 0 | 0 | XXXX XX10 | 0 | 0 | XXXX XX10 | 0 | 1 | XXXX XXX1 | 1 | 0 | XXXX XXXX | 1 | 0 |

FIG. 21

EFFICIENT STACK UTILIZATION FOR COMPILING AND EXECUTING NESTED IF-ELSE CONSTRUCTS IN A VECTOR DATA PROCESSING SYSTEM

CONTINUATION IN PART

This application is a continuation-in-part of application Ser. No. 08/040,779 filed Mar. 31, 1993, now U.S. Pat. No. 5,717,947 issued on Feb. 10, 1998 by Michael G. Gallup et al., and assigned to the assignee hereof, entitled "A Data Processing System and Method Thereof."

CROSS-REFERENCE TO A RELATED APPLICATION

This application is related to our commonly assigned copending patent application entitled:

"Vector Move Instruction In A Vector Data Processing System And Method Therefor" by Yee-Wei Huang and Jason Spielman, U.S. Pat. No. 5,600,811 issued on Feb. 4, 1997.

FIELD OF THE INVENTION

The present invention relates to a data processor and, in particular, to a data processor which performs vector operations.

BACKGROUND OF THE INVENTION

Data processing systems which execute vector operations are becoming increasingly popular in many data intensive application including those in the areas of fuzzy logic, neural network, and graphics accelerator applications due to their considerable performance and cost benefits. Additionally, with the increased execution of vector operations, the corresponding difficulty of programming data processors to execute operations in parallel has proportionally increased. In particular, compilers required to translate a programmers language into code comprehensible by the data processor have encountered a number of obstacles.

One such obstacle involves the use of nested conditional operations such as "if-then-else" constructs in a software program which is to be compiled. Such conditional constructs are common in most programs, but are difficult to compile for data processors executing vector operations. During execution of a vector operation by a data processing system, multiple processing elements are utilized to concurrently perform a data processing operation on each element of a vector value. Therefore, compilation of conditional constructs is made more difficult because the condition must be tested in each of a plurality of processing elements and specific processing elements must be enabled or disabled as a result of the execution of the conditional constructs.

The difficulty with the compilation of conditional constructs is becoming more relevant as use of vector processing is increasing. Thus far, most compiler implementations attempting to translate conditional constructs to a language understandable by a data processor have provided only limited processing for vector conditional constructs. For more information, see ILLIAC IV SYSTEMS CHARACTERISTICS AND PROGRAMMING MANUAL, IL4-PM1, published Jun. 30, 1970 by Burroughts Corporation.

BRIEF DESCRIPTION OF THE DRAWINGS

FIG. 5 illustrates in tabular form a function of each of a plurality of data bits stored in a vector process control register of FIG. 4.

FIG. 6 illustrates in tabular form a data bit definition for each of the plurality of data bits stored in a vector process control register of FIG. 4.

FIG. 7 illustrates in tabular form a transition table for a Vt and a Vh bit during execution of a conditional instruction.

FIG. 8 illustrates in tabular form an example of a state of a Vt and a Vh bit for each of a plurality of processing elements during execution of a plurality of conditional instructions.

FIG. 9 illustrates in tabular form the contents of each of the plurality of processing element registers after execution of the example of FIG. 8.

FIG. 14 illustrates in state diagram form a state tree for implementing a portion of software code having nested conditional constructs.

FIG. 15 illustrates in tabular form an example of a state of a Vt and a Vh bit for each of a plurality of processing elements during execution of a plurality of conditional instructions.

FIG. 16 illustrates in state diagram form a state tree for implementing a portion of software code having nested conditional constructs.

FIG. 21 illustrates in tabular form an example of a state of a Vt and a Vh bit for each of a plurality of processing elements during execution of a plurality of conditional instructions.

FIG. 22-1 illustrates in flow chart form a series of steps executed by a compiler when translating nested conditional constructs in accordance with a first embodiment of the present invention.

FIG. 22-2 illustrates in flow chart form a second portion of the series of steps executed by a compiler when translating nested conditional constructs in accordance with a first embodiment of the present invention.

FIG. 22-3 illustrates in flow chart form a third portion of the series of steps executed by a compiler when translating nested conditional constructs in accordance with a first embodiment of the present invention.

DETAILED DESCRIPTION OF THE INVENTION

Figure 1:
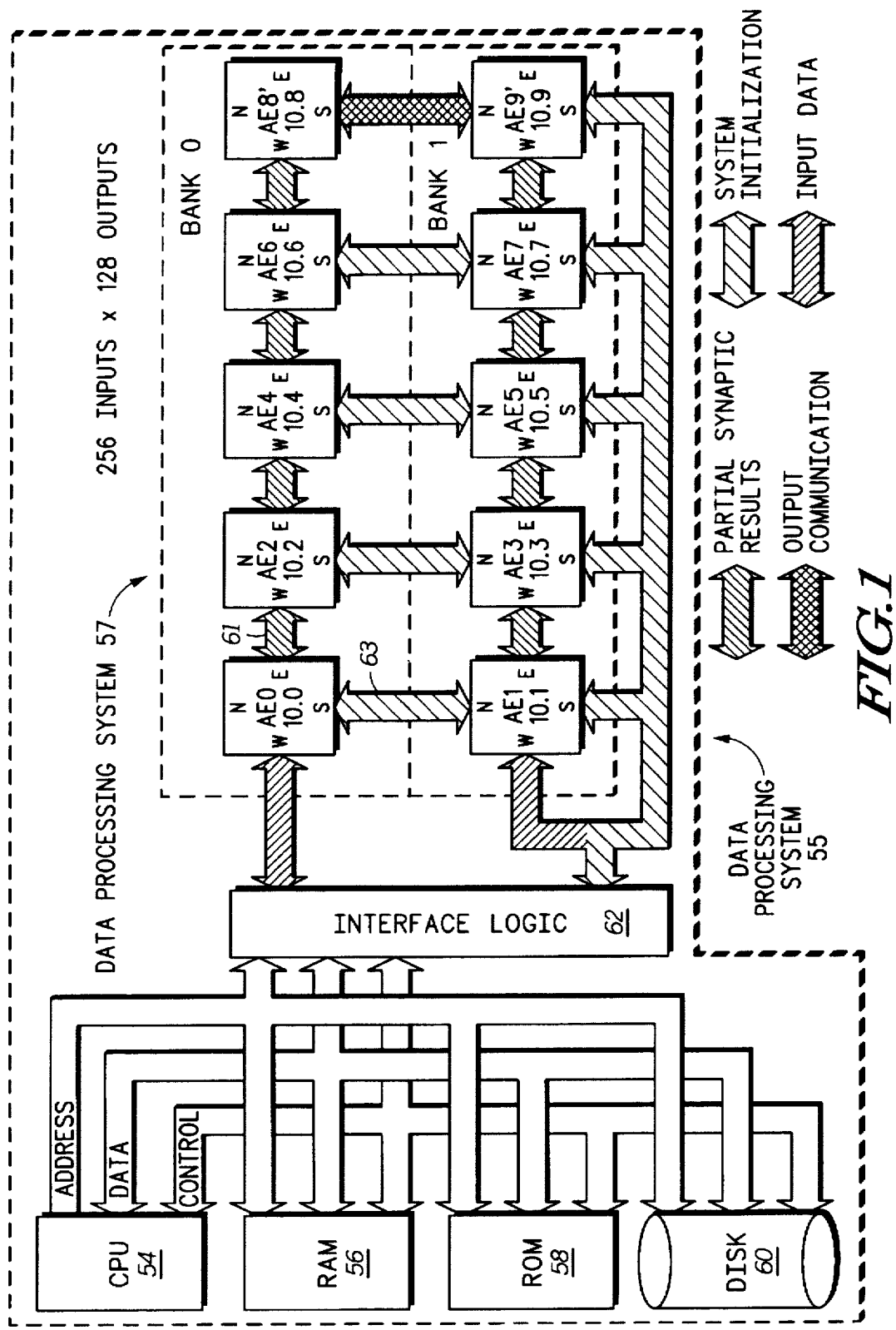
FIG. 1 illustrates in block diagram form a processing system in accordance with an embodiment of the present invention.

The present invention provides a data processing system and method for compiling software programs having nested conditional constructs for use in data processors having a SIMD (single instruction path, multiple data paths) architecture. In data processors having a SIMD architecture, multiple processing elements perform the same operation on multiple data elements such that a single operation is performed by all processing elements operating concurrently. Therefore, because multiple processing elements may operate concurrently, it is common to use a vector as a data unit. Each of the processing elements then is responsible for a single component of the vector.

When conditional operations such as "if-else" constructs are executed, there are fundamental differences between scalar architectures and parallel architectures such as that discussed above. In a scalar data processor, an "if-else" operation may be implemented simply by changing a flow of control of the data processor. For example, consider a following example:

| Instruction 1: | If (A>8) |
| Instruction 2: | Say "Video" |
| Instruction 3: | Else |
| Instruction 4: | Say "Game" |

In a scalar data processor, if the "if" portion of the conditional statement is not satisfied, the flow of control of the data processor jumps from Instruction 1 to Instruction 3. However, in a vector data processor, each of the processing elements must evaluate the conditional statement. Assume that the vector data processor only has two processing elements. A first processing element may satisfy the "if" portion of the conditional-statement, but the second processing element may not. Since both processing elements must execute the same instruction because there is a single instruction path, the flow of control of the data processor may not be modified as it was in the scalar data processor. However, in the vector data processor, appropriate processing elements must be activated and deactivated to perform the same function. For instance, if the example given above is executed by a vector data processor, both processing elements may execute all four instructions, but one processing element may be deactivated for Instruction 2 and the other processing element may be deactivated for Instruction 4. Such an execution scheme in vector data processors introduces complexities when a programmer wishes to program arbitrarily nested conditional constructs.

The present invention provides a methodology for compiling software code that performs arbitrarily nested conditional constructs in vector data processors. The present invention implements a vector bit stack to record which processing elements were activated and which processing elements were deactivated during execution of a nested conditional construct. Subsequently, when an end of a first nested conditional construct is encountered, a state of the processing elements at a point in time in which the first nested conditional construct was initiated may be popped off of the vector bit stack and a second conditional construct or any other operation may be executed. Therefore, conditional constructs may be executed while ensuring the proper state of the processing elements throughout the execution. The compiler program disclosed in the present patent application effectively utilizes the vector bit stack to store prior states of each of the processing elements of the vector data processor such that the processing elements may be efficiently restored to a correct intermediate value.

A description of connectivity for each of the circuits illustrated in the figures of the present patent application will now be provided. Furthermore, for clarity and completeness, operation of a general vector data processor will be discussed first in the following specification. Secondly, operation of an Association Engine (AE) data processor will be discussed. Subsequently, a theory of operation of nested conditional constructs in both the general vector data processor and in the AE data processor will be discussed. Operation of the compiler for programming nested conditional constructs in both the general vector data processor and the AE data processor will then be explained in greater detail. Additionally, an instruction which may be implemented in the AE data processor to optimize performance of such nested conditional constructs will be discussed.

Note that during the following discussion, the terms "assert" and "negate" will be used when referring to the rendering of a signal, status bit, or similar apparatus into its logically true or logically false state, respectively. If the logically true state is a logic level one, the logically false state will be a logic level zero. And, if the logically true state is a logic level zero, the logically false state will be a logic level one.

Additionally, the term "bus" will be used to refer to a plurality of signals which may be used to transfer one or more various types of information, such as data, addresses, control, or status. The symbol "$" or the symbol "0x" preceding a number indicates that the number is represented in its hexadecimal or base sixteen form. Likewise, the symbol "H" following a number indicates that the number is represented in its hexadecimal or base sixteen form. The symbol "%" preceding a number indicates that the number is represented in its binary or base two form.

Description of Connectivity

FIG. 1 illustrates in block diagram form a data processing system 55. Data processing system 55 includes a CPU 54, a RAM 56, a data processing system 57, a ROM 58, a disk 60, an interface logic circuit 62, a first plurality of processing elements forming a bank 0, and a second plurality of processing elements forming a bank 1. CPU 54, RAM 56, ROM 58, and disk 60 are each bidirectionally coupled to interface logic circuit 62 via an Address bus, a Data bus, and a Control bus. Interface logic circuit 62 is coupled to the plurality of processing elements forming each of bank 0 and bank 1. Additionally, each of the first plurality of processing elements of bank 0 are bidirectionally coupled to a next one of the first plurality of processing elements of bank 0 and a next one of the second plurality of processing elements of bank 1. Each of the second processing elements of bank 1 are also bidirectionally coupled to a next one of the second plurality of processing elements of bank 1.

Figure 2:
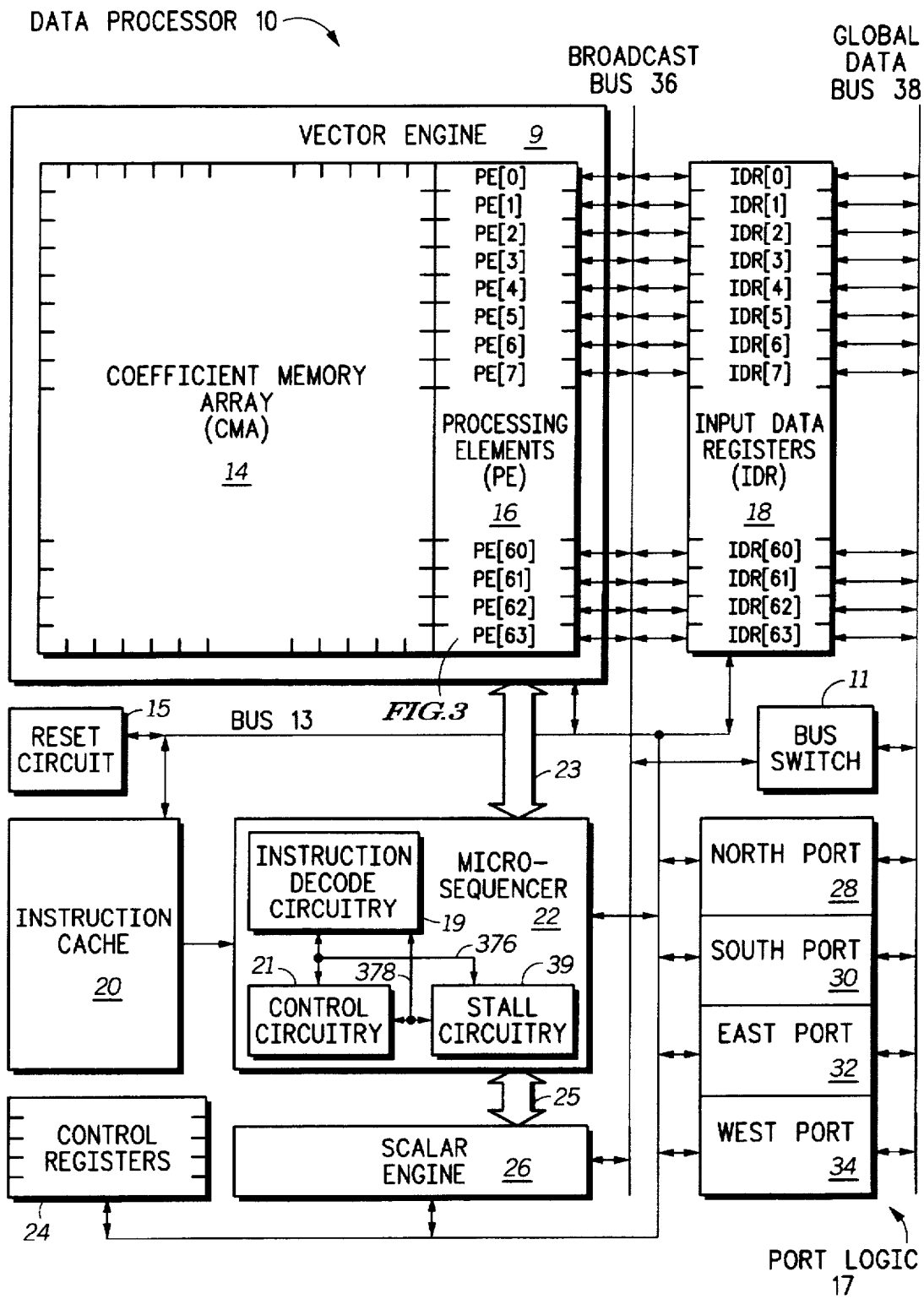
FIG. 2 illustrates in block diagram form a data processor in accordance with an embodiment of the present invention.

FIG. 2 illustrates an Association Engine (AE) processor 10 in greater detail. AE processor 10 includes a vector engine 9, a bus switch 11, a bus 13, a coefficient memory array (CMA) 14, a reset circuit 15, a plurality of processing elements (PE) 16, a port logic circuit 17, a plurality of input data registers (IDR) 18, an instruction cache 20, a micro-sequencer 22, a plurality of control register 24, and a scalar engine 26. Port logic circuit 17 includes a north port 28, a south port 30, an east port 32, and a west port 34. Micro-sequencer 22 includes an instruction decode circuitry 19, a control circuitry 21, and a stall circuitry 39.

Each of the plurality of processing elements 16 of vector engine 9 is bidirectionally coupled to a Broadcast Bus 36. Each of the plurality of input data registers 18 is bidirectionally coupled to Broadcast Bus 36 and to a Global Data bus 38. CMA 14, IDR 18, reset circuit 15, instruction cache 20, control registers 24, scalar engine 26, and port logic circuit 17 are all coupled to a Bus 13. Bus switch 11 and port logic circuit 17 are coupled to Global Data bus 38. The plurality of processing elements 16 are coupled to micro-sequencer 22 via a Bus 23. Micro-sequencer 22 is also coupled to scalar engine 26 via a Bus 25. Instruction cache 20 is coupled to micro-sequencer 22.

Figure 3:
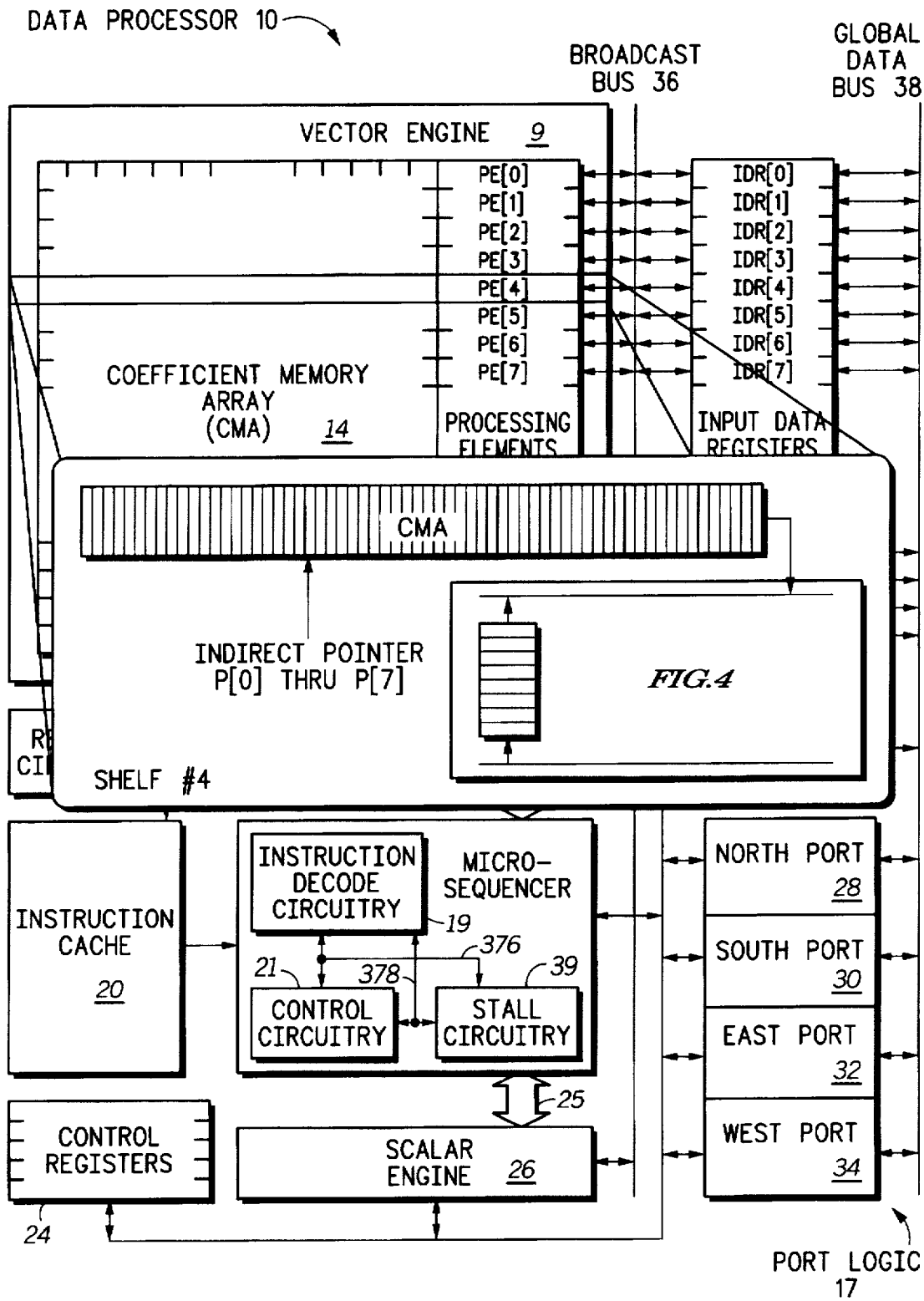
FIG. 3 illustrates in block diagram form a plurality of vector engine registers of the data processor of FIG. 5.

FIG. 3 illustrates the plurality of processing elements of vector engine 9. Each of the plurality of processing elements of vector engine 9 is illustrated in greater detail in FIG. 4.

Figure 4:
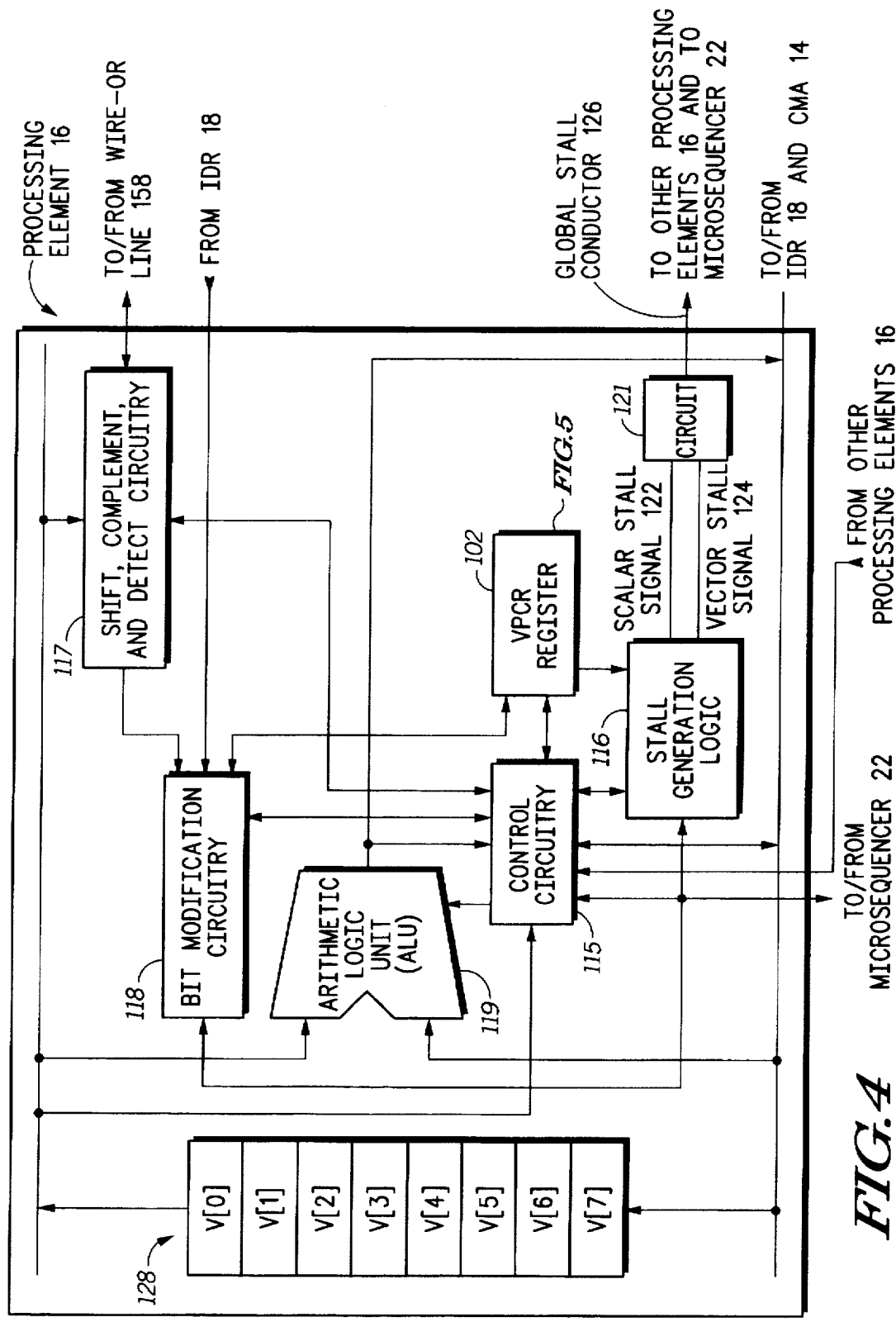
FIG. 4 illustrates in block diagram form the plurality of vector engine registers of FIG. 3 in greater detail.

FIG. 4 illustrates each of the plurality of processing elements in greater detail. Each of the plurality of processing elements includes a VPCR register 102, a control circuitry 115, a stall generation logic circuit 116, a shift, complement and detect circuitry 117, a bit modification circuitry 118, an arithmetic logic unit (ALU) 119, a circuit 121, and a plurality of vector registers 128.

IDR 18 and CMA 14 are coupled to each of the plurality of vector registers 128, ALU 119, control circuitry 115, and shift, complement and detect circuitry 117. Shift, complement and detect circuitry 117 is bidirectionally coupled to wire-or line 158. IDR 18, shift, complement and detect circuitry 117, VPCR register 102, control circuitry 115, and stall generation logic 116 are coupled to bit modification circuitry 118. ALU 119, VPCR register 102, and circuit 121 are coupled to control circuitry 115. Control circuitry 115, stall generation logic 116, and bit modification circuitry 118 are coupled to micro-sequencer 22. Others of the plurality of processing elements 16 are coupled to control circuitry 115. Circuit 121 provides a Global Stall Conductor 126 to others of the plurality of processing elements 16 and to micro-sequencer 22.

Figure 10:
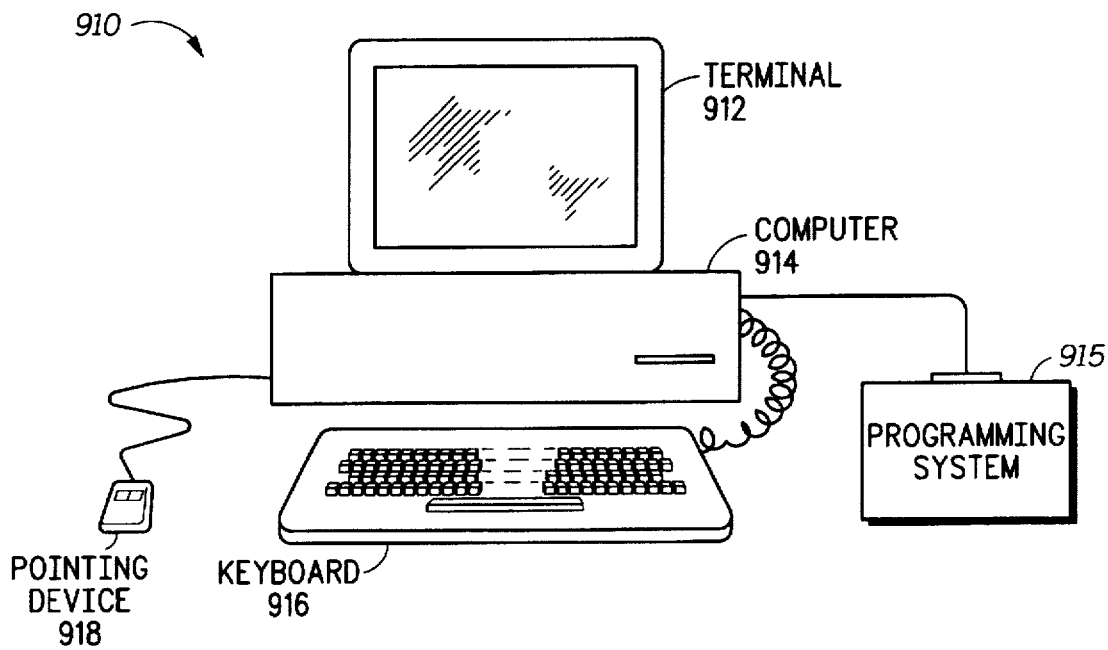
FIG. 10 illustrates in block diagram form a data processing system which implements a compiler in accordance with the present invention.

FIG. 10 illustrates a computing system 910. Computing system 910 includes a terminal 910, a computer 914, a programming system 915, a keyboard 916, and a pointing device 918. Computer 914 is coupled to each of terminal 912, programming system 915, keyboard 916, and pointing device 918.

Figure 11:
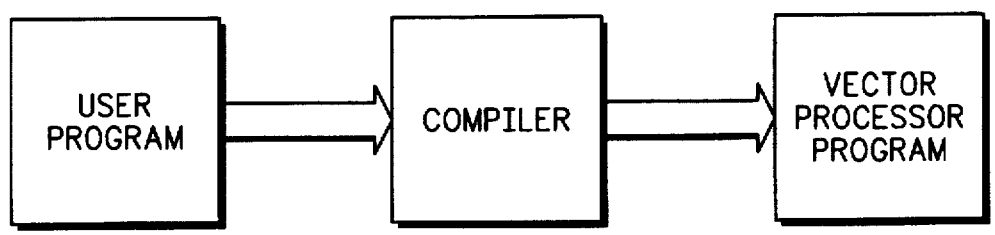
FIG. 11 illustrates in block diagram form a function of a compiler in the data processing system of FIG. 10.

FIG. 11 illustrates a compiler system 920. Compiler system 920 includes a user program 922, a compiler 924, and vector processor program 926. Compiler 924 receives user program 922 and translates it to vector processor program 926.

Description of Operation of a Vector Data Processor

During a following discussion, a general description of the Association Engine (AE) processor will be provided. However, it should be acknowledged that the AE processor is provided as an example of a vector data processing environment. Therefore, the current invention is not limited to compiling software code associated with the AE, but may compile software code associated with any vector data processor which includes a mechanism for storing previous states of its processing elements.

FIG. 1 illustrates an Association Engine (AE) which is capable of being configured in a variety of ways. A flow of data from a simplest configuration (one Association Engine) to more complex implementations is consistent. Data flows from a host to the Association Engine, from the Association Engine to the Association Engine prime (Association Engine'), and from the Association Engine' back to the host, or onto another layer for multi-layer applications. Although each Association Engine device has a unique number, the prime notation (Association Engine') is used to distinguish Association Engines with different microprogram contents or functions.

The Association Engine includes dedicated ports, labeled N, S, E, and W, for North, South, East, and West respectively. During a host access to the Association Engine array, the ports take on dedicated functions for supplying address and data information to the Association Engine/Host. Under program control, all ports use the same basic transfer protocol allowing them to be interconnected to one another when implementing inter-layer, or intra-layer, communications. The following section will give an overview of data flow through these ports.

Each Association Engine in the subsystem receives address, data and control stimulus from the host system through an external interface circuit. All initialization, status monitoring, and input passes through this interface. In FIG. 1 the host interface is connected to the west and south ports. There are several programmable modes for transferring data between the Association Engines and the host, which are described in more detail in the parent patent application. One data transfer mode may be more suitable than others for accomplishing a specific function such as initialization, status checking, Coefficient Memory Array (CMA) set-up or inputting of operational data for the purposes of computation. This section of the document, with the exception of the discussion on the inputting of operational data, will not discuss the appropriate transfer mode for each function. The details of these transfer modes are discussed in Section 2.2 Association Engine Signal Description and Section 3 Association Engine Theory of Operation of the parent patent application.

Prior to any operational data being input into the Association Engine, many of the major areas of the device must be initialized. Care has been taken in the definition of the default values for the Association Engine to insure that minimum effort is required by the host to place the Association Engine in an operational state. Refer to Section 3 Association Engine Theory of Operation of the parent patent application for a more detailed definition of the areas requiring initialization by the host.

Each Association Engine in the subsystem is responsible for taking the appropriate number of Input Data Vectors, calculating the Partial Synapse Results for the neurons, and transferring the results to the associated Association Engine'. Input data vectors are typically transferred from the host to the Association Engines while the Association Engines are executing their micro programs. These modes of data streaming, along with the other modes of access are described in detail in Section 3.5.1 Host Transfer Modes and Section 3.5.2 Association Engine Transfer Modes of the parent patent application.

The Association Engine subsystem illustrated in FIG. 1 supports an Input Data Vector stream of 256 bytes that can be viewed as 4 partial input vectors. Each Association Engine supports 64 bytes of the Input Data Vector stream. Associated control signals and internal configurations on each Association Engine are responsible for determining when that Association Engine should accept its segment of the data from the host.

As stated before, each Association Engine can receive up to 64 input samples, and each Association Engine calculates up to 64 Partial Synapse Results. Association Engines can be chained together to allow for wider Input Data Vectors. A chain of one or more Association Engines must be connected to an Association Engine' to aggregate the Partial Synapse Results of all the Association Engines in that chain to form the output. A chain of Association Engines connected to a Association Engine' is called a Bank. Each Bank is capable of handling 64 neurons. FIG. 1 illustrates two Banks, Bank 0 and Bank 1. The illustrated subsystem is therefore capable of handling 128 neurons.

In Bank 0, the first partial output value from Association Engine 0 (10.0) is combined with the first partial output values from Association Engines 2 (10.2), 4 (10.4) and 6 (10.6) to generate the output of the first neuron in that Bank. The aggregation of the total neuron output values is done inside the Association Engine 8'. All Partial Output Values (or Partial Synapse Results, for Neural Network Architectures) are passed from the Association Engines to the Association Engine', across the east/west ports.

The Association Engine includes a Single Instruction, Multiple Data (SIMD) computing engine capable of executing a wide variety of arithmetic and logical operations. All sixty-four Processing Elements compute their data values in lock-step. In most implementations, the Association Engines will be computationally bound due to the complexity of the algorithms being supported. The Association Engine, due to its pipelined internal architecture, can hide a significant portion of the compute overhead in the input data transfer time. This is because the Association Engine can begin the compute function as the first sample of the Input Data Vector arrives and does not have to wait for the entire Input Data Vector to be received before starting. A microcode instruction set is available to the user for downloading into the microcode memory array to perform the computations on the input data For more information, refer to Section 2.5 Association Engine Microcode Instruction Set Summary of the parent patent application.

Once the Partial Synapse Result is computed for all sixty-four neurons (the compute function is done in parallel for all sixty-four neurons) the Partial Synapse Result for each of the sixty-four neurons is transferred from the Association Engine to the associated Association Engine' over the East-West Port under microprogram control. The Partial Synapse Results transferred from the Association Engine to the Association Engine' may vary in width due to the types of calculations performed or the precision of those calculations. Appropriate control lines, similar to the control lines for the host transfers, are used to sequence the flow of data from each Association Engine to the Association Engine'. As Association Engines complete the calculations for their associated data, they monitor these control lines and, at the appropriate time place their results on the bus. Depending on the size and complexity of the network, external isolation and buffering circuitry may be required for proper bus operation. In most instances though, the control signals used by the Association Engine and the Association Engine' to control the bus are sufficient for controlling this external circuitry. Once all the Partial Synapse Results are totaled together (in the Association Engine') the output function can be applied to the total. A single Association Engine will be described in greater detail in FIG. 3 and FIG. 4. Each of the registers described below may be found in each of the sixty-four processing elements of vector engine 9.

Coefficient Memory Array (CMA)

Each processing element may access a set of sixty-four (8-bit) CMA locations which are used to hold mapping coefficients for each processing element. CMA 14 can be accessed indirectly by using the Global Pointer Registers (P[0]–P[7]). The syntax for this type of indirect addressing can be found in Section 2.5.3 Microcode Instruction Formats of the parent application. It should also be noted that using register indirect addressing mode causes all processing elements to index the same CMA column. For more information on the CMA, please see Section 2.3.50 of the parent application.

Vector Data Registers (V[0]–V[7])

Each processing element contains a set of eight (8-bit) general purpose registers which can be used during a computational process. These registers are labeled (V[0]–V[7]) 128 in FIG. 4. These registers can be used as temporary and resultant storage during computation. The use of these registers is interchangeable, which means that these registers are not used by the Association Engine for anything other than general purpose data.

Vector Process Control Register (VPCR)

VPCR 102 includes the condition/processing bits from a previous vector ALU operation, as well as bits which control the loading of the destination register in vector engine 9. For a list of these bits, refer to FIG. 5. Each processing element of vector engine 9 includes contains a VPCR 102 which controls the flow of multi-byte arithmetic and logical operations. VPCR 102 can also be used to indicate the status of the most recent arithmetic operations.

In VPCR 102, the Vector Extension Bits (VX[1:0]) are used to extend the precision of certain arithmetic instructions. For a description of how these bits are set, and how they are used by the microcode, please see Table 2.64 in Section 2.5 Association Engine Microcode Instruction Set Summary and Section 2.5.20 Process Computation Control of the parent patent application.

The Vector Overflow Bit (VV) and the Vector Overflow Direction Bit (VD) are used to indicate both the occurrence of overflow in the previous arithmetic operation, and, if overflow occurred, the direction in which overflow was taken. For instructions which provide saturation protection, VV indicates if saturation occurred, while VD indicates which direction the saturation occurred. For a more complete description of how the VV and VD bits are set and used, please see Table 2.64 in Section 2.5 Association Engine Microcode Instruction Set Summary of the parent patent application.

The Vector Conditional Bits (Vt and Vh) allow the conditional vif-velse-vif-vendif instructions to operate properly (and independently) on all processing elements. When the Vt bit of a processing element is not set (Vt=0), the entire shelf (processing element and its 64 CMA locations) is considered inactive. If the destination of an instruction is one of the Vector Registers (V[0]–V[7]) or the CMA, then the destination will not generally be updated. The Vh bit allows the velse-vif part of the conditional structure to operate properly. This indicates whether or not the processing element has won a conditional if statement since the execution of the last vendif instruction.

The Valid Input Data Bit (VID) indicates whether the corresponding location in Input Data Register (IDR) 18 is valid. For example, if IDR[13] is written, then VID in processing element #13 is set (PE[13]:VID=1). For a description of saturation, please see Section 2.5.9 Saturating verses Non-saturating Operations of the parent patent application.

Vector Engine Conditional Operations

The Association Engine provides for the conditional execution of instructions to be implemented in a straight-forward manner which requires a minimal amount of circuitry, but which nevertheless allows a great deal of software flexibility. Three conditional instructions types are used, namely "vif", "velse", and "vendif". The letter "v" at the beginning of the instruction name indicates that the instruction is a vector instruction. The "vif" instruction type is actually a set of instructions having a mnemonic form of "vif" and including a conditional test. The set of "vif" instructions includes the following individual instructions:

| "vif" instructions | condition |
| --- | --- |
| "vifeq" | if equal |
| "vifge" | if greater than or equal to |
| "vifgt" | if greater than |
| "vifle" | if less than or equal to |
| "viflt" | if less than |
| "vifne" | if not equal to |
| "vifnv" | if no overflow |
| "vifv" | if overflow |

In alternate embodiments of the present invention, more, less, or different conditions could be included in the "vif" type of instruction. Also, in alternate embodiments of the present invention, additional or different conditional instructions types could be used.

The present invention also uses two bits within each processing element 16, namely the Vt bit and the Vh bit. The Vt bit and the Vh bit are both located in the Vector Process Control Register (VPCR) 102. Alternate embodiments of the present invention may use more than one bit (Vt bit) to represent an enable value or mask value. Likewise, alternate embodiments may use zero or more than one bit (Vh bit) to represent a history value. The Vh bit 112 is called the history value or history bit because it indicates the history or prior logic states of the Vt bit.

FIG. 7 illustrates the next state transition table for Vt bits and Vh bits resulting from execution of "vif", "velse", and "vendif" instructions. The column labeled $Q_n$ represents the current logic state of the Vt bit and the Vh bit before the specified conditional instruction is executed (see the right-most column for the specified conditional instruction). The column labeled $Q_{n+1}$ represents the next logic state of the Vt bit and the Vh bit at the conclusion of execution of the specified conditional instruction (see the rightmost column for the specified conditional instruction).

The combination of the enable value (Vt bit) and the history value (Vh bit) allows software programming constructs to be implemented at the circuitry level. For example, a high-level software construct using "if", "elseif", "else", and "endif" high-level software commands can be implemented at the circuitry level using the "vif", "velse", and "vendif" instructions along with the enable value (Vt bit) and the history value (Vh bit). Each processing element 16 participates in only one of the "if", "elseif", and "else" portions of software instructions. The history value indicates whether or not the processing element 16 has participated in one of the prior "if" or "elseif" portions of software instructions. Note that if the "if" and "else" constructs are used without the "elseif" construct, the Vh bit is not required. Note that operations may not nest using only the if and else constructs in this embodiment of the invention, however.

For implementing most common high-level constructs, the first instruction in a sequence will be one of the "vif" instructions and the last instruction in the sequence will be an "vendif" instruction. A simple sequence may have only one "velse" instruction between the "vif" instruction and the "vendif" instruction. A more complex sequence may have multiple "velse"-"vif" instruction pairs followed by a "vendif" instruction as illustrated in the example in FIG. 8.

Note that "vif", "velse", and "vendif" instructions can be nested by using general purpose registers to hold sequential copies of the Vt bits. Referring to the parent patent application, the left shift instructions "vlshftt" and "vlshfth" and the right rotate instructions "vrotrt" and "vrotrh" can be used to stack and unstack sequential copies of the Vt bits and the Vh bits.

Conditional operations use the VPCR Vt and Vh bits to control the execution of subsequent instructions in each of the processing elements 16. The VPCR Vt bit is set when an vif instruction is evaluated to be TRUE, or when an vendif instruction is executed. The Vt bit is cleared by the velse instruction if any previous vif (since the last vendif) evaluated to be TRUE. The Vt bit, when cleared, prevents instructions from updating the vector destination or vector process control register.

The VPCR Vh bit contains the history of the Vt bit for an vif-velseif, or vif-velseif-velseif-vendif sequence. (note: The velseif instruction does not exist at the microcode level, but is simply a concatenation of the two instructions velse and vif). The Vh bit is set on the execution of the velse instruction if the previous vif instruction evaluated TRUE. The Vh bit is cleared on the execution of the vendif instruction.

Refer to Section 2.5.21 Effect of the VPCR Vh and Vt Bits on PE processing in the parent patent application for a full description of the effects the Vh and Vt bits have on the execution of instructions. Refer to Section 3.6.5.4 Conditional Execution for example code segments that describe the conditional execution of instructions in the SIMD Vector Engine.

Effect of Conditional Instruction on the Vt and Vh Bits

To clarify the functionality of the Vt and Vh bits, FIG. 7 illustrates a next state transition table for the Vt and Vh bits respectively. Remember, the vif instruction is executed only if the Vt bit is set. The velse and vendif instructions are executed independently of the Vt bit. The reset or initial condition is Vt=1 and Vh=0.

Note that if the Vt bit is set, the current instruction is allowed to update the destination register. If, however, if the Vt bit is cleared, then the destination register is not updated. This blocking function also applies to updating the VPCR register bits. The function of the Vh bit is to save the history of the Vt bit and to control when the VPCR Vt bit can be modified. So, by combining the Vt and the Vh bits, there is a hierarchy of control in the execution of instructions in the SIMD Vector Engines.

Conditional Execution

The basic idea behind the conditional instructions is to clear (or set) the processing mask bit Vt. It is this bit that controls the operation of microcode instructions in the processing elements (PE). In the example illustrated in FIG. 8, four of the eight vector registers are tested and based on these tests certain processing elements execute instructions while others do not. In this example assume that all PEs start out with Vt=1 and Vh=0. The first two opcodes (opcode 1 and opcode 2) are executed by all processing elements (PEs). The vifeq V0,V4 instruction causes the Vt bits to be cleared in PE2, PE3 and PE4. This causes opcode 3 to be executed only in PE1. The next velse instruction sets the Vh bit in PE1 and the Vt bits in PE2, PE3, and PE4, thereby allowing opcode 4 to be executed by PE2, PE3 and PE4. The vifeq V1,V4 causes PE2 Vt bit to remain set while clearing PE3 and PE4 Vt bits. Remember that PE1 has fallen out of the possible PE list that execute instructions. This action causes opcode 5 to be executed in PE2. The following velse instruction sets the PE2 Vh bit and the Vt bits in PE3 and PE4, thereby allowing PE3 and PE4 to execute opcode 6. The vifeq V2,V4 instruction sets the Vt bit in PE3 and clears the Vt bit in PE4. This allows opcode 7 to be executed only in PE3. The velse instruction allows PE4 to execute the opcode 8 instruction. Finally the vendif instruction resets all the PEs back to their pre-vif state so PE1, PE2, PE3 and PE4 execute opcode 9. This is the basic mechanism for performing vif-velse-vif-velse-vendif type of structures. FIG. 9 provides the contents of the processing element registers.

Description of Present Invention

The previous text discussed a vector processor which is capable of executing conditional instructions. Because the processor may be programmed to execute such conditional instructions, a compiler must be provided for translating a higher level programming language to software code comprehensible by the vector processor when such conditional operations are required.

FIG. 10 illustrates a computer system (910) in which a compiler might be developed and exercised. In computer system 910, a programmer may input program information to computer 914 via keyboard 916 and pointing device 918. Computer 914 executes the compiler of the present invention to generate generic software code which is capable of compiling arbitrarily nested conditional instructions.

The theory underlying the compiler of the present invention will subsequently be discussed in greater detail. To simplify the following discussion, assume that "if-else" operations may be described as set operations. Assume that U is a set of all process elements, U={PE0, PE1, PE2, ... ,PE63}. A subset of U, S ⊆ U, may be described with a bitmask, Bs. Bs=[b0, b1, b2, ... , b3], where bi=1 if PEi is active, else bi=0. In the following discussion, S and Bs will be used interchangeably. An "if-else" construct is an operation that partitions set S into two mutually disjoint subsets, S0 and S1. S0 and S1 do not intersect (S0∩S1=∅) and combined S0 and S1 (S0∪S1=S) form S. An "if-else" construct may also exclude the else-clause. It will be initially assumed that both clauses exist even if the else clause is empty.

Figure 12:
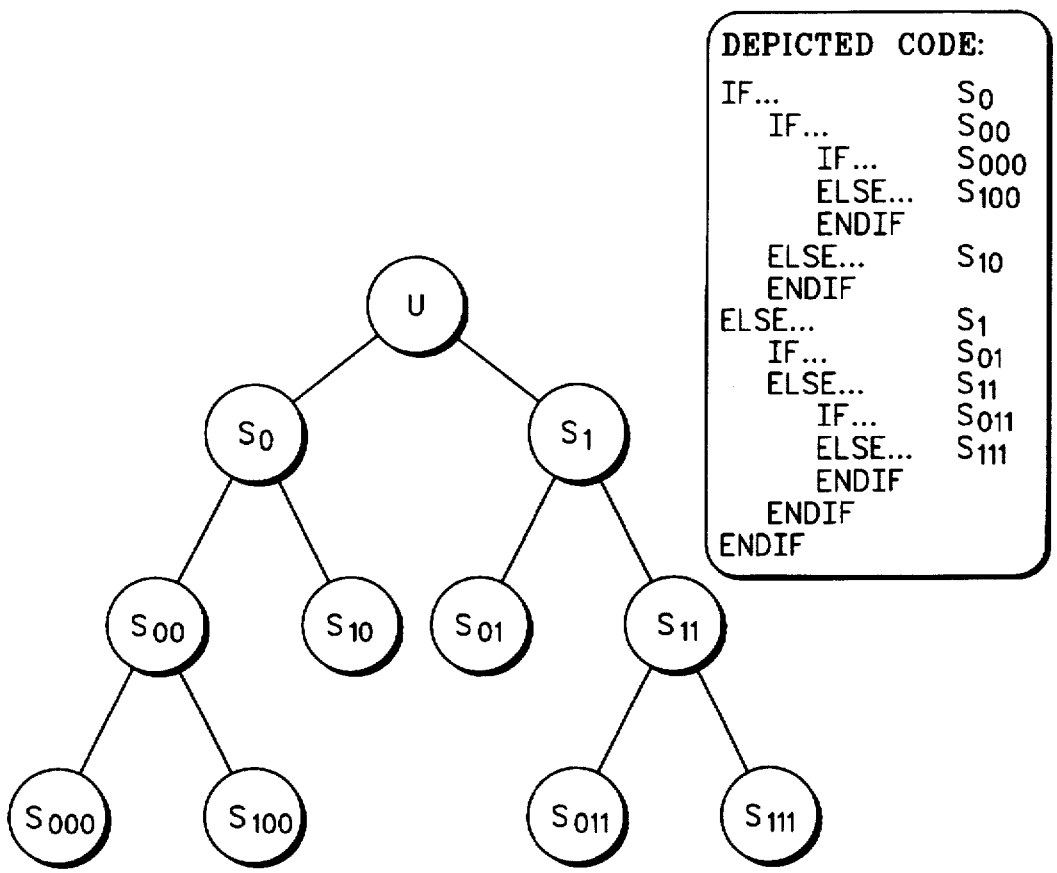
FIG. 12 illustrates in state diagram form a state tree for implementing a portion of software code having nested conditional constructs.

FIG. 12 illustrates an example of how processing elements are partitioned through the use of various "if-else" constructs. In the "tree" of processing elements of FIG. 12, each node represents a set of processing elements that are active for either the "if" portion of the construct or for the "else" portion of the construct. For example, if a first "if" is satisfied in the depicted code associated with the processing element tree, those processing elements which are active during the "if" code are represented by node S0. Those processing elements which are active during the "else" code are represented by node S1.

Initially, when a program begins at node U, all processing elements are active. Thus, if this code was executed by the Association Engine described above, a Vt bit associated with each processing element would be asserted. As execution of the program progresses, each "if-else" statement partitions the processing elements into two groups. A first group satisfies the "if" test and a second group does not. In FIG. 12, each left branch of the processing element tree represents those processing elements which satisfy the "if" test and participate in the if portion of the programming clause. Each right branch of the processing element tree represents those processing elements which satisfy the "else" test and participate in the else portion of the programming clause.

To simplify subsequent discussion, the terms scope and state must be defined. A state of a node is a set of active processing elements of that node or, more simply, a set of processing elements represented by that node. For example, in the Association Engine described above, the Vt bits indicate a state of a processing element. In alternative vector data processors, other bits or registers may serve a similar function. Additionally, a scope of a node is defined to be a set of processing elements which are defined in a node's parent. In FIG. 12, a scope of a node is a state of the parent node. For example, a scope of node S00 is a state of node S0. Therefore, both the "if" and "else" clauses of an "if-else" construct share a same scope. Put another way, the state includes those processing elements which are currently active for the if clause or the else clause. The scope includes those processing elements to which subsequent if-else statements apply.

Generally, a fixed number of processing elements comprise the vector engine. As previously described, vector instructions operate on all processing elements simultaneously. If and else statements simply activate and deactivate appropriate processing elements. At all times a bit mask is maintained to specify which processing elements are currently active. Thus, each node represents a value of a current bit mask.

Figure 13:
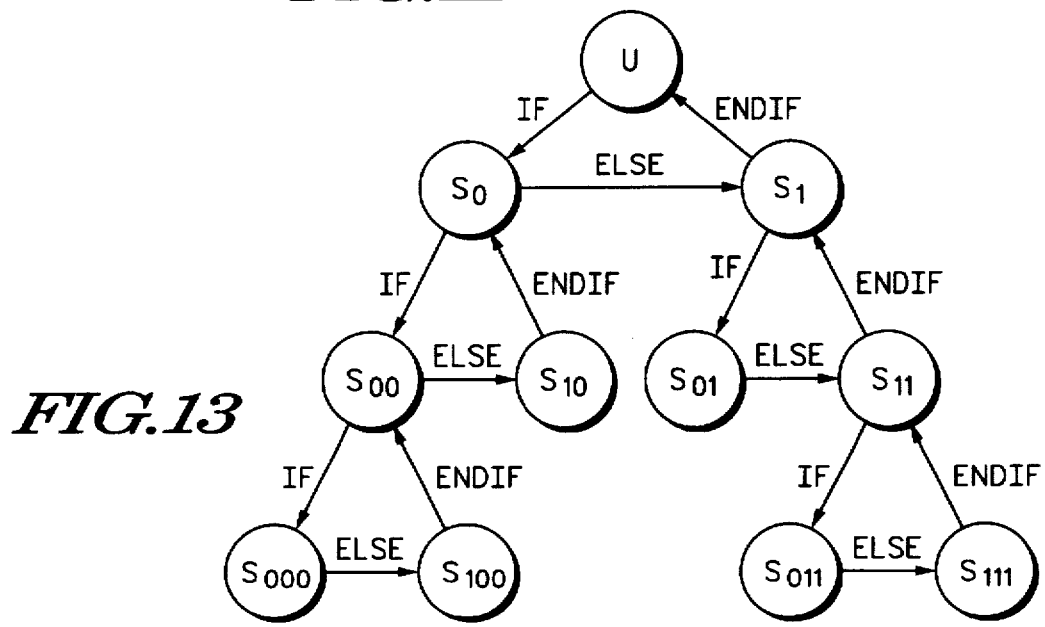
FIG. 13 illustrates in state diagram form a state tree for implementing a portion of software code having nested conditional constructs.

In the example illustrated in FIG. 12, an "if" statement yields a left branch and an "else" statement yields a right branch. An "endif" statements completes a nesting level. Hence a code sequence performs an ordered traversal of the tree from top to bottom. This traversal is illustrated in FIG. 13.

Recall that vector "if-else" constructs do not change a flow of control in a vector data processor. Vector "if-else" constructs merely activate or deactivate processing elements. Therefore, in order to require arbitrary nesting of "if-else" constructs, a stack is required to keep track of scope information. Consider a following example illustrated in FIG. 14 and FIG. 15.

FIG. 14 illustrates a processing element tree which corresponds to a nested conditional construct determined by the corresponding software code. FIG. 15 illustrates a state of each of the active processing elements at each stage of program execution. In the initial state U, all processing elements are active. In a next state, State 1 and node S0, assume that only processing elements 0 through 3 (PE0–PE3) satisfy the first "if" clause. In State 2 and at node S00, only processing elements 2 and 3 (PE2 and PE3) satisfy the "if" clause. In State 3 and at node S10, processing elements 0 and 1 (PE0 and PE1) satisfy the "else" clause. State 4 represents a state and node (S1) which is entered for those processing elements which don't satisfy the initial "if" clause. Therefore, processing elements 4 through 6 (PE4 through PE6) are asserted in this state.

Consider a transition from State 2 to State 3 in FIG. 15. This is an inner "if-else" construct. An "else" statement should toggle the active or inactive processing elements which are within its scope. Therefore, it is very important to retain scope information during execution of arbitrarily nested conditional constructs. For instance, if scope information were not retained, it would be impossible to differentiate processing elements 0 and 1 (PE0 and PE1) from processing elements 4 through 6 (PE4 through PE6) based only on State 2 information. However, based on a scope of a current "if-else" construct (State 1), a vector processor knows that processing elements 4 through 6 should remain inactive. Hence, for an "if-else" processing element tree of a depth of two, a state of size two is required. Similarly, for a processing element tree of a depth "n," a state of size "n" is required. In fact, at any node in the processing element tree, a stack will store bit masks for each node on the path from the parent of the current node up to the root in the present embodiment of the invention.

In light of such observances, the compiler of the present invention executes a following series of steps to compile arbitrary nested conditional constructs in a vector data processor.

| | | |
|---|---|---|
| •If Transition: | 1. | Push the current active bit mask on the stack. |
| | 2. | Deactivate those processing elements that fail the if test (i.e. set a new current bit mask) |
| •Else Transition: | 1. | Set the current bit mask to be the current bit mask XOR'ed with the bit mask on top of the stack |
| •Endif Transition: | 1. | Pop the stack and set the current bit mask to that value. |

By compiling each "if," "else," and "endif" type instruction in a software program using the series of steps provided above, an in-order traversal of a processing element tree may be simulated in linear software code. The exclusive OR (XOR) operation in the "else" transition will toggle only those processing elements in the scope of the current "if-else" construct. Note that some other logical operation may also be used in place of an exclusive OR operation in alternate embodiments of the present invention. Additionally, note that the general scheme proposed in the present embodiment of the invention will toggle only those processing elements in the scope of a current "if-else" construct. Such a general method of operation will provide correct results even if all of the processing elements are not active at the start of an operation.

AE Code Implementation

The present invention compiles arbitrarily nested conditional constructs in a general manner which may be efficiently used with most vector data processors. As a more specific example, the present invention will be used to compile code for the Association Engine, a vector data processor which was previously described in greater detail. In the Association Engine processor, specific vif, velse, and vendif instructions are implemented.

A vif instruction deactivates all processing elements which fail the "if" portion of a conditional construct. Additionally, only currently active processing elements are considered for testing. The previously discussed Vt bits are used to determine which processing elements are active. Active processing elements participate in the test and those processing elements that satisfy the "if" portion of the conditional construct have a corresponding Vt bit remain asserted. The processing elements which fail the "if" portion of the conditional construct have a corresponding Vt bit negated. A vendif instruction sets a Vt bit of all processing elements to zero. A velse instruction acts in accordance with both the Vt and Vh bits of the processing elements. If the Vh bit is set, then a state of the processing element does not change. Otherwise, if the Vh bit is negated and the Vt bit is asserted, the processing element is deactivated. When the processing element is deactivated, the Vt bit is negated and the Vh bit is set. If neither the Vt bit nor Vh bit is set, then the processing element is activated. When the processing element is activated, the Vt bit is asserted.

During operation, eight vector registers (See V[0]–V[7] of FIG. 4) are available for general use. In the Association Engine, it is possible to left shift the Vt bits into one of the vector registers using the vlshftt instruction. The Vt bits are not affected by the vlshftt instruction. A specified vector register is left shifted and the Vt bits are copied into the least significant bits. Similarly, a right rotate instruction, vrotrt, that right rotates the specified vector register and copies the least significant bits into the Vt bits. Both the vlshftt and the vrotrt instructions may be used to save and restore Vt bits during execution of nested conditional constructs. The compiler of the present invention may then implement a high level software program in the following manner:

| | | |
|---|---|---|
| •If Transition: | vlshftt V0 | ;Push the current Vt bit state onto ;stack |
| | vif . . . | ;Perform if test and activate only ;required PE's (creates new state) |
| •Else Transition: | vlshftt V1 | ;Copy current state onto V1 (we ;only care about the lsbit) |
| | vendif | ;Set all PE's active during ;calculation of new bit mask |
| | vxor V0, V1 | ;Xor state and scope to determine ;new state (only care about lsbit) |
| | vrotrt V1 | ;Set new state of Vt bits |
| •Endif Transition: | vrotrt V0 | ;Pop scope off of stack |

In the example given above, V0 is a vector register which includes sixty-four single byte values where one byte is associated with each processing element. The present invention uses this vector register as a bit mask stack. Each time a bit mask is pushed onto vector register V0, one bit is pushed into each byte corresponding to an appropriate processing element. In this manner, a single vector register, such as V0, may serve as a stack with eight levels. Vector register V1 is used for intermediate calculations while building a new bit mask. Additional registers for a bit mask stack would be required if more than eight nesting levels are required. The choice of V0 and V1 for use as a stack and scratch space is arbitrary and any other choice would work equally well if used consistently.

To clarify this operation, refer to FIG. 16 and the associated code. In this operation, the compiler would translate the depicted software code to the following assembly code which is readable by the Association Engine processor.

| AE Code | |
|---|---|
| vlshftt V0 | ; if; Push S |
| vif . . . | ;if (cont); Create S0 |
| . . . | ; Body 1 |
| vlshftt V0 | ; if; Push S0 |
| vif . . . | ; if (cont); Create S00 |
| . . . | ; Body 2 |
| vlshftt V0 | ; if; Push S00 |
| vif . . . | ; if (cont); Create S000 |
| . . . | ; Body 3 |
| vlshftt V1 | ; else; Create S100 |
| vendiff | ; else (cont) |
| vxor V0, V1 | ; else (cont) |
| vrotrt V1 | ; else (cont) |
| . . . | ; Body 4 |
| vrotrt V0 | ; endif; Pop S00 |
| . . . | ; Body 5 |
| vlshftt V1 | ; else; Create S10 |
| vendif | ; else (cont) |
| vxor V0, V1 | ; else (cont) |
| vrotrt V1 | ; else (cont) |
| . . . | ; Body 6 |
| vrotrt V0 | ; endif; Pop S0 |
| . . . | ; Body 7 |
| vlshftt V1 | ; else; Create S1 |
| vendif | ; else (cont) |
| vxor V0, V1 | ; else (cont) |
| vrotrt V1 | ; else (cont) |
| . . . | ; Body 8 |
| vrotrt V0 | ;endif; Pop S |

Some optimizations may be performed if one has knowledge about the vector system being used. To more clearly understand such optimizations in terms of the Association Engine processor, a mechanism employed by the Association Engine to more efficiently perform nested conditional constructs will be discussed.

A common "if-else" construct has the following form:

```
if . . .
else
  if . . .
  else
    if . . .
    . . .
    endif
  endif
endif
```

In this construct, an original set of active processing elements is essentially partitioned into many mutually disjoint subsets. The Association Engine processor allows a software coding of this common construct to be extremely efficient. As stated earlier, the Association Engine processor uses the Vt bits as a bit mask of active processing elements. The Vt bits are stored in the VPCR (vector process control register 102), a sixty-four byte register. The VPCR also stores the Vh, or "vector history," bits. The Vh bits are used to specify that processing elements have participated in prior "if" clauses and should not be reactivated in a subsequent operation. In this specialized and common "if-else" construct, three instructions associated with the Association Engine processor are used. These instructions include vif, velse, and vendif and have been previously described in greater detail.

The use of the vif, velse, and vendif instructions allows a programmer to implement the specialized chaining if-else construct described above without using a stack. In this case, the software code for implementing such a function on the Association Engine processor would be as follows:

```
vif . . .
velse
vif . . .
velse
vif . . .
velse
vif . . .
velse
vif . . .
. . .
vendif
```

In this software implementation on the Association Engine processor, no stack is needed because it is a highly linear construct. At each else statement, previously active processing elements may be deactivated for any future use. A Vh bit effectively locks processing elements from future activation by a velse instruction. Therefore, the compiler of the present invention recognizes that a stack is not required and may optimize software code programmed into the Association Engine processor appropriately. In this first optimization, all processing elements of the Association Engine processor should initially be activated. If not, a subsequent velse instruction will activate processing elements that should otherwise remain inactive. This requirement may be overcome by enabling the compiler of the present invention to execute a second software code optimization routine.

Figure 17:
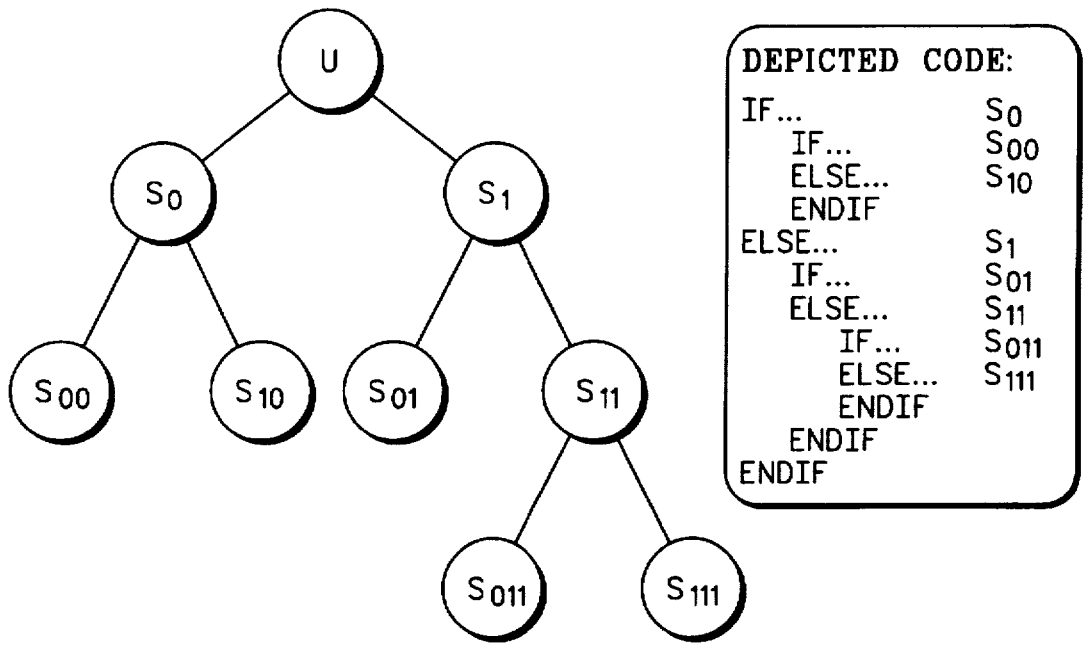
FIG. 17 illustrates in state diagram form a state tree for implementing a portion of software code having nested conditional constructs.

In the second software code optimization routine, the compiler optimizes if-else constructs on a case-by-case basis. Therefore, for if-else constructs that end in the specialized chained else-if format described above, the stack is not required. Refer to FIG. 17 for a processing element tree illustrating such an optimization and the software code associated with the processing element tree. Note that in FIG. 17, a rightmost sub-tree includes a specialized if-else construct of the Association Engine processor. Therefore, when the compiler reaches the specialized if-else construct, the general stack scheme of the compiler of the present invention may be discarded. Code implementing the second optimization routine is illustrated below.

| vlshftt V0 | ; if; Push S |
|---|---|
| vif . . . | ;if (cont); Create S0 |
| . . . | ; |
| vlshftt V0 | ; if; Push S0 |
| vif . . . | ; if (cont); Create S00 |
| . . . | ; |
| vlshftt V1 | ; else; Create S10 |
| vendif | ; else (cont) |
| vxor V0, V1 | ; else (cont) |
| vrotrt V1 | ; else (cont) |
| . . . | ; |
| vrotrt V0 | ; endif; Pop S0 |
| . . . | ; |
| vlshftt V2 | ; else***; Create S1 |
| vendif | ; else*** |
| vmov V0, V1 | ; else*** |
| vxor #-1, V1 | ; else*** |
| vrotrh V1 | ; else *** Lock Out PE's not in scope |
| vrotrt V2 | ; else*** |
| velse | ; else*** |
| . . . | ; Now the Built-In Instructions of the AE may be ; used |
| vif . . . | ; if; Create S01 |
| . . . | ; |
| velse | ; else; Create S11 |
| vif . . . | ; if; Create S011 |

| | |
|---|---|
| ... | ; |
| velse | ; else; Create S111 |
| ... | ; |
| vrotrt V0 | ; endif; Pop S |
| | ; endif |
| | ;endif |

In the above software code, the instructions that define a first else-clause in the chain are starred (***). These instructions are needed to allow the compiler to optimize the software code for the specialized chain else-if constructs discussed earlier. Together, the starred instructions do not allow selected processing elements to participate in the special chained else-if case. This is necessary because a velse instruction could potentially activate a processing element that should otherwise remain inactive. Such a processing element would be one which is not within the current scope. By setting the Vh bits associated with the processing elements that should remain inactive, the potential activation posed by a subsequent velse instruction may be alleviated. Normally, in a specialized chained else-if construct, the compiler would use the velse instruction to define an else clause of a conditional construct. However, when the chain is nested in some if-else tree such as that illustrated in FIG. 17, the compiler must deactivate processing elements which are not within the scope of the chain. To take advantage of a chained else-if construct, the compiler must identify the else-clause which begins the chain. At that else-transition, one must negate a scope and set the Vh bits of the affected processing elements. Subsequently, a velse instruction may be executed. Note that to negate the scope, all processing elements must be active. Therefore, the Vt bits must be saved to the stack in the vector register and subsequently restored for use by the velse instruction. After the chained if-else special case has been handled, the Vh bits may be cleared and the state restored to resume other nested constructs (if any).

Throughout the present discussion, four possible nesting possibilities have been discussed. A first nesting possibility is an "if" clause nested in an "if" clause. In this nesting possibility; a set of active processing elements must be further restricted from an existing set of processing elements. The compiler executes such a nesting possibility by testing only those processing elements which are originally active and then activating only those originally active processing elements which satisfy the "if" clause.

A second nesting possibility exists when an "if" clause is nested in an "else" clause. The compiler executes this second nesting possibility by setting the Vt bits appropriately. A third nesting possibility exists when an "else" clause is nested in an "if" clause. In this case, the compiler must establish a stack of scope information in a vector register. As previously discussed, an "else" clause must have scope information so that it may activate only appropriate processing elements. A fourth nesting possibility exists when an "else" clause is nested in an "else" clause. In this fourth nesting possibility, scope is also required. However, in this instance, the Vh bit mechanism of the Association Engine processor effectively satisfies this need. The single level scope information represented by the Vh bit mechanism is sufficient because the fourth construct does not require returning to a previous scope.

It may be observed from the preceding summary that a critical conditional construct involves the presence of an "else" clause within an "if" clause. In this situation, a scope stack is required. However, in cases where else clauses are omitted, the stack mechanism implemented by the compiler of the present invention may be disregarded. To illustrate this example, consider a case illustrated in FIG. 18 in which there is no "else" clause.

Figure 18:
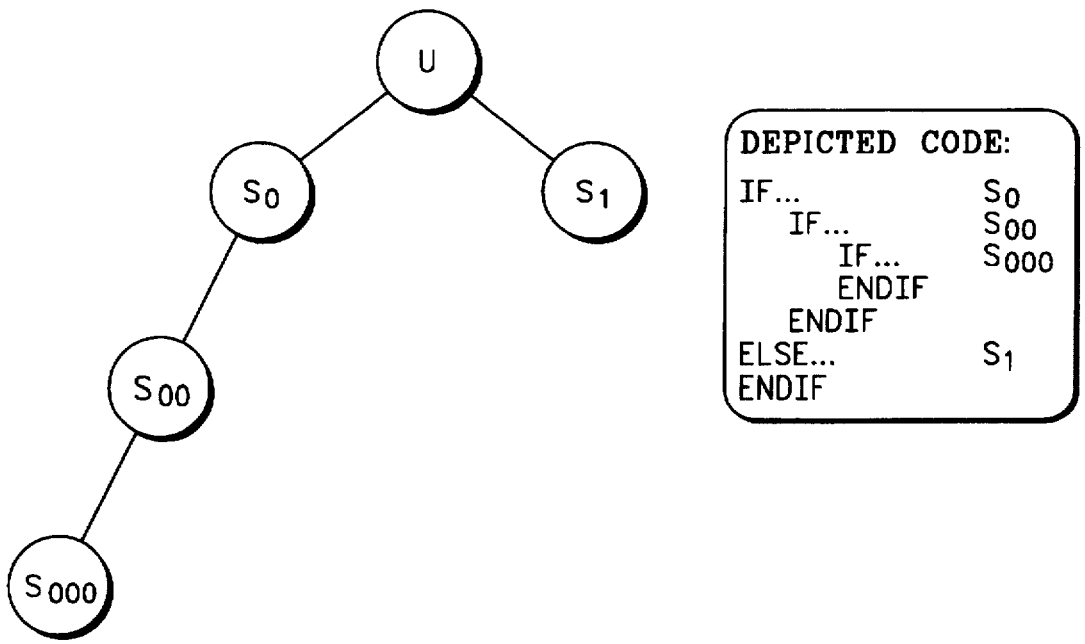
FIG. 18 illustrates in state diagram form a state tree for implementing a portion of software code having nested conditional constructs.

In FIG. 18, S is an initial state of active processing elements which must be pushed on the stack for use later in the generation of state S1. Other than S, S0 is an only other state which should be saved because it is the only "if" clause that has an accompanying "else" clause. When else clauses are omitted, time and space optimizations may be employed. Software code corresponding to such a case is provided below.

| | |
|---|---|
| vlshftt V0 | ; if; Push S |
| vif ... | ;if (cont); Create S0 |
| ... | ; |
| vlshftt V0 | ; if; Push S0 |
| vif ... | ; if (cont); Create S00 |
| ... | ; |
| vif ... | ; if; Create S000 |
| ... | |
| vrotrt V0 | ; endif; Pop S0 |
| vlshftt V1 | ; else; Create S1 |
| vendif | ; else (cont) |
| vxor V0, V1 | ; else (cont) |
| vrotrt V1 | ; else (cont) |
| ... | ; |
| vrotrt V0 | ; endif; Pop S |

Note that since states are not pushed onto the stack, the endif instructions required to pop them off may also be omitted. Additionally, since S00 was not needed to generate a sibling "else" (S10) or a child "else" (S100), its state does not have to be saved on the stack.

Figure 19:
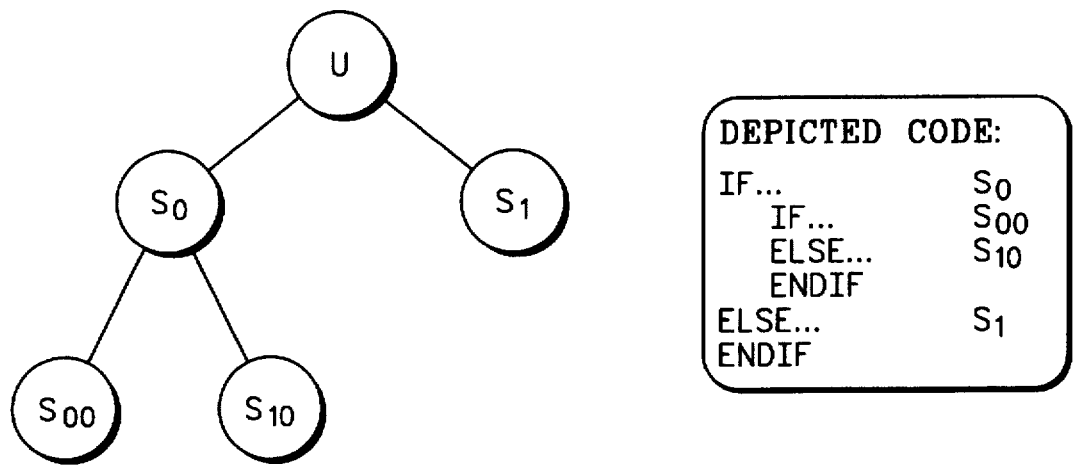
FIG. 19 illustrates in state diagram form a state tree for implementing a portion of software code having nested conditional constructs.

In a final optimization scheme, the compiler observes that if an if-else construct is initiated with all processing elements active, then the compiler may omit pushing the initial state onto the stack. For an example, refer to FIG. 19. In this example, the compiler would provide the following software code to the Association Engine processor.

| | |
|---|---|
| vif ... | ;if (did not push scope onto stack); Create S0 |
| ... | ; |
| vlshftt V0 | ; if; Push S0 |
| vif ... | ; if (cont); Create S00 |
| ... | ; |
| vendif | ; else; Create S10 |
| vmov V0, V1 | ; else (cont) |
| vlshftt V1 | ; else (cont) |
| vxor V0, V1 | ; else (cont) |
| vrotrt V1 | ; else (cont) |
| ... | ; |
| vrotrt V0 | ; endif; Pop S0 |
| velse | ;else (only need to complement the state); Create S1 |
| ... | ; |
| vendif | ;endif (only need to reset all processing elements to an ;active state |

In a typical operation, the top level scope would be pushed onto the stack and would later be logically combined (XOR'ed) with a result of a first "if" test to determine the processing elements that belong in the "else" clause. However, when all processing elements are activated at the beginning of a nested condition construct, the result of the first "if" test would be XOR'ed with a mask of all logic one values. A desired result may be obtained simply by negating a state of the "if" clause.

Given the general description and each of the optimization possibilities described herein, the compiler of the present invention may generally use the following coding methodology. In a first step, the compiler will map out a high level if-else tree which should be coded. Subsequently, the previously discussed instruction sequences will be applied where if, else, and endif statements are used. Then, the resulting code will be optimized using the following optimizations.

1. Replace chains of else-if . . . else-if . . . sequences with the Association Engine vif and velse instructions and use the Vh bits to deactivate processing elements which are not within a current scope.
2. Eliminate stack management code when else-clauses are omitted.
3. If all processing elements begin in an activated state, then eliminate the top-level stack usage and replace the else sequence with a simple velse.

Summarization of Compiler for Nested Conditional Constructs

The functions performed by the compiler of the present invention are summarized in the flowcharts illustrated in FIG. 22-1, FIG. 22-2, FIG. 22-3, and FIG. 22-4.

Figure 23:
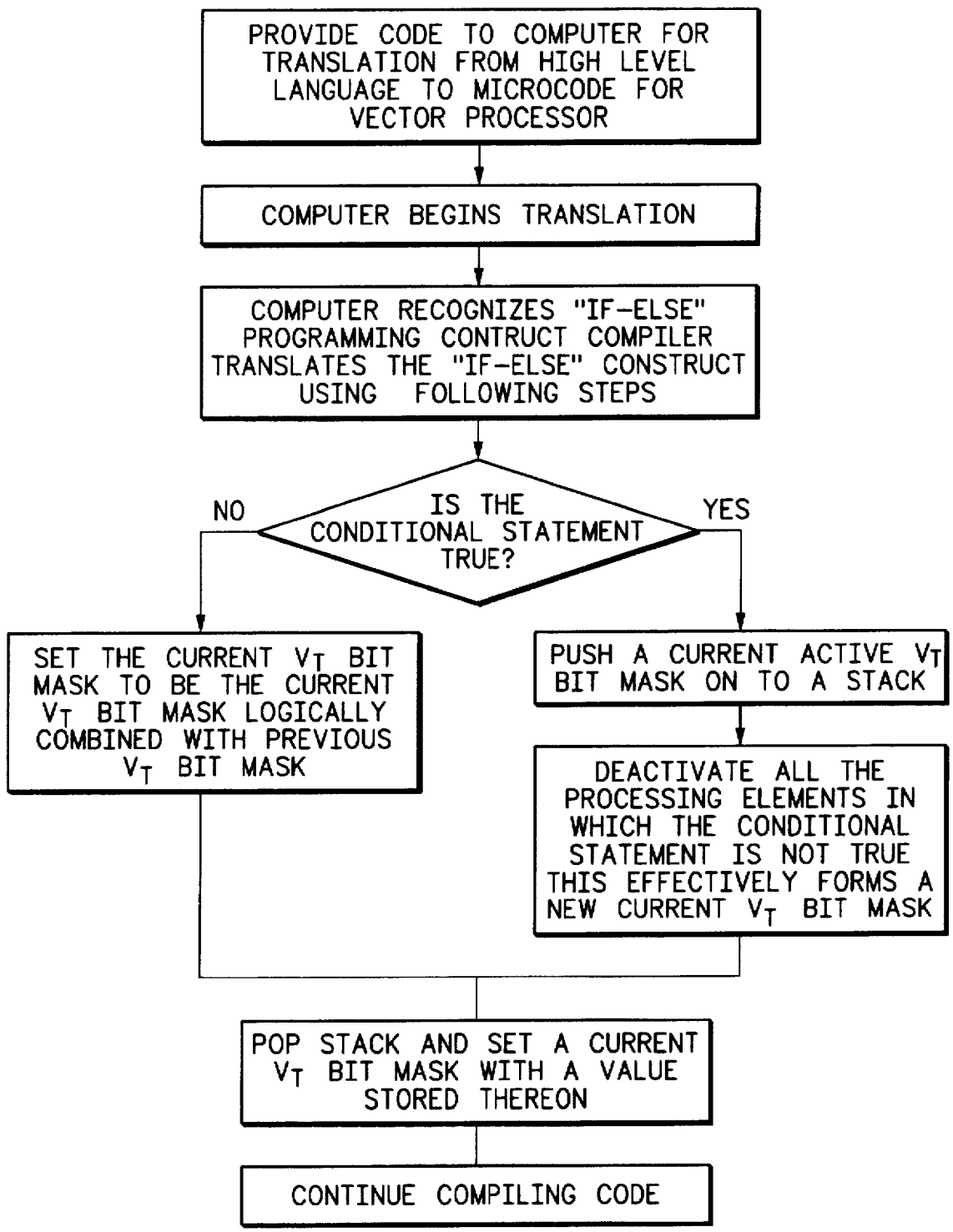
FIG. 23 illustrates in flow chart form a series of steps executed by a compiler when translating nested conditional constructs in accordance with a second embodiment of the present invention.

FIG. 23 illustrates a general methodology by which the compiler of the present invention translates an arbitrarily nested conditional construct from a high level programming language to software code which is understandable by a vector data processor. In FIG. 23, a first step is to provide a computer such as computer 914 of FIG. 10 with software code for the computer to translate from a high level language to microcode for the vector data processor. Note that the software code may be entered by a keyboard (916), a programming system (915), or any other input device. After receiving the software code, the computer begins to translate the high level language to microcode. The compiler within the computer subsequently recognizes an "if-else" programming construct. The compiler then begins to translate the "if-else" construct using the following steps.

In a first step, the compiler determines if the conditional statement is true. If the conditional statement is true, the compiler provides instructions which will push a current active Vt bit mask on to a stack stored in a register or memory. Note that the term Vt is not meant as a limitation to the present invention, but is intended to encompass any circuit or device within a vector data process which reflects a current state of a processing element. After the current active Vt bit mask is pushed on to a stack, all of the processing elements in which the conditional statement is not true are deactivated. Thus, a new current Vt bit mask is effectively formed.

If the conditional statement is not true, the compiler sets a current Vt bit mask as a logically combination of a current Vt bit mask with a previous Vt bit mask. Then, a first value on the stack is retrieved (or popped) and stored as a current Vt bit mask. The compiler then continues to compile code until a nested conditional construct is reached.

Figures 1, 2, 22:
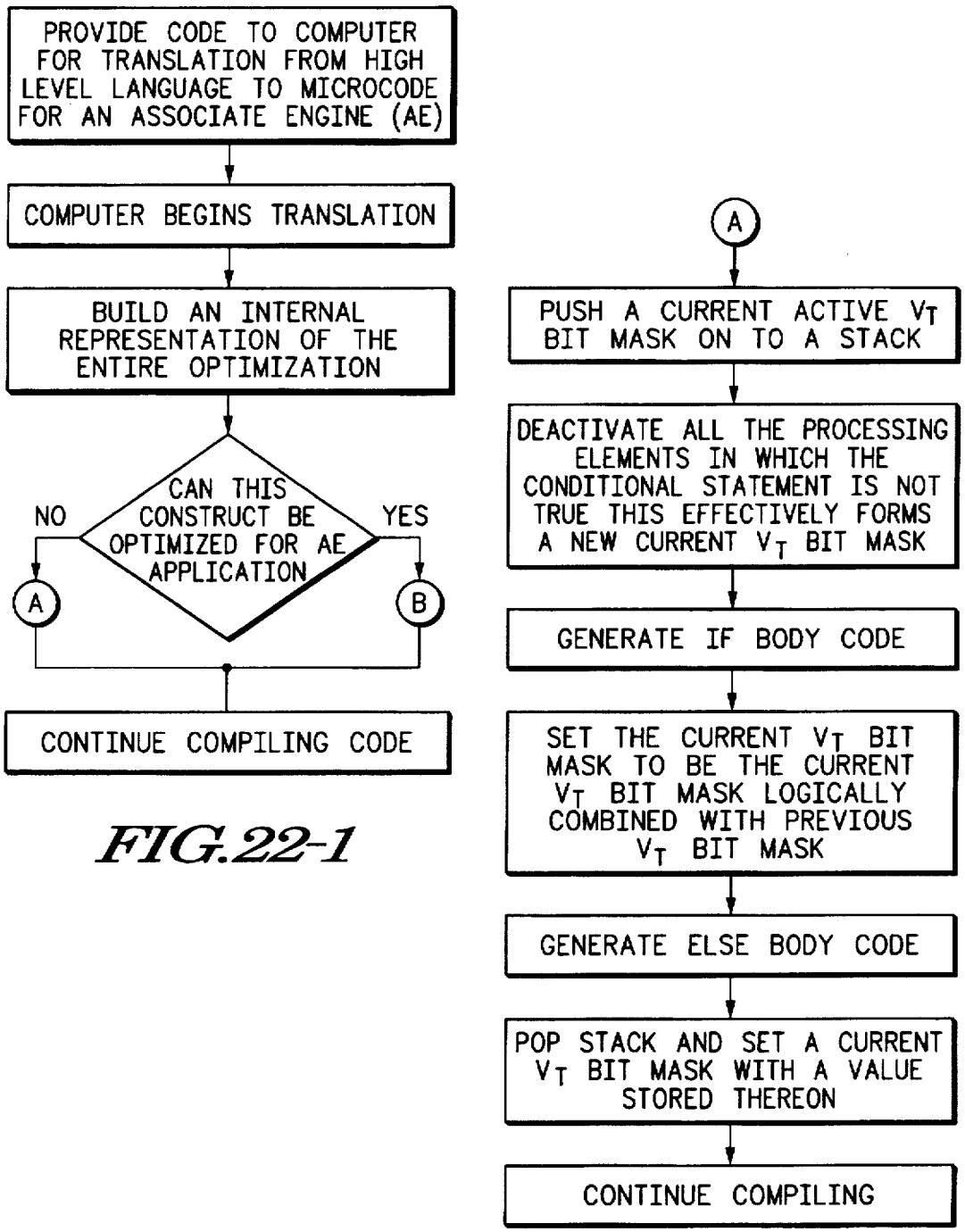
Figures 3, 22:
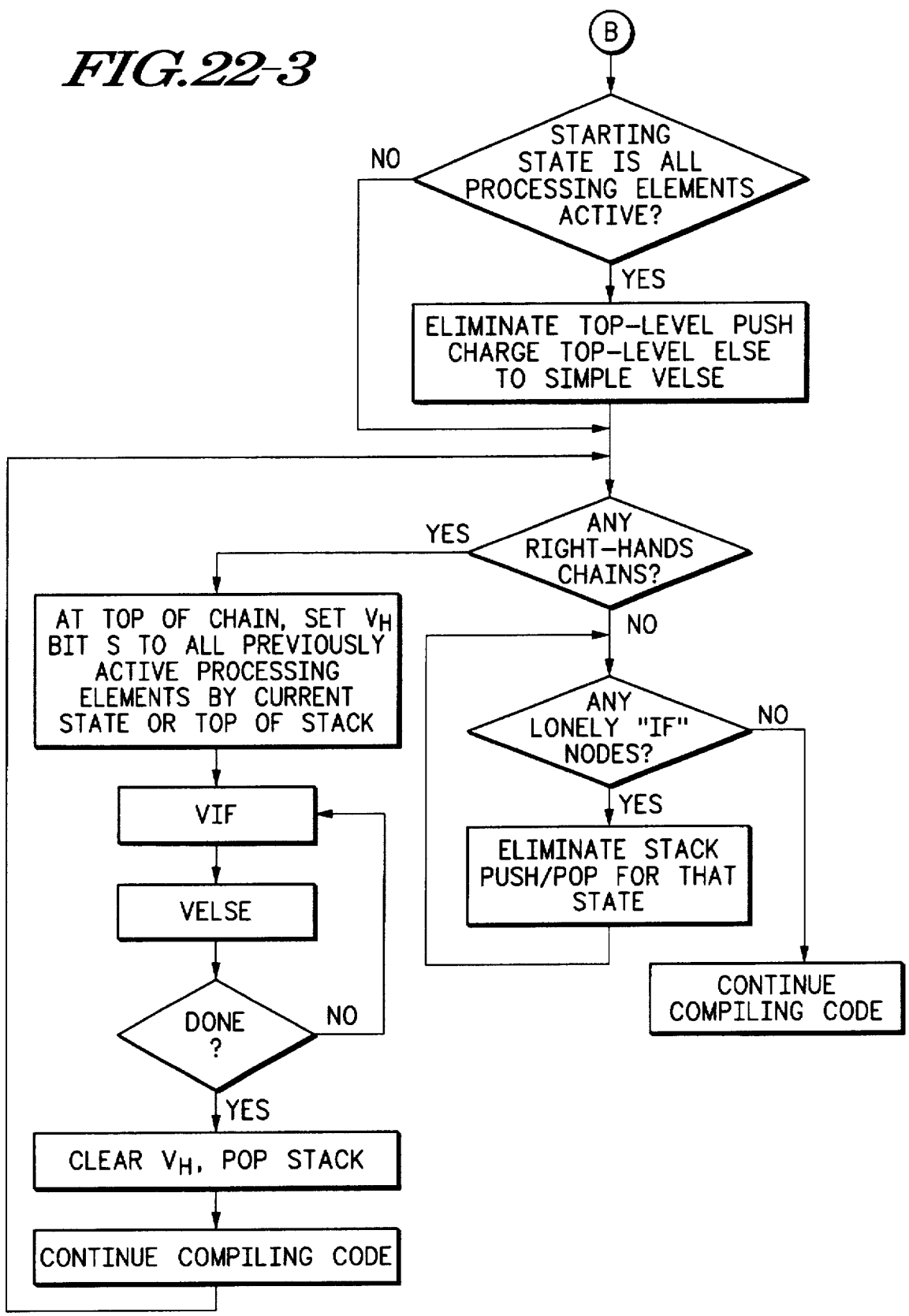

FIGS. 22-1, 22-2, 22-3, and 22-4 illustrate a methodology which is executed by the compiler when the vector data processor is an Association Engine (AE). In FIG. 22-1, a first step is to provide a computer such as computer 914 of FIG. 10 with software code for the computer to translate from a high level language to microcode for the vector data processor. Note that the software code may be entered by a keyboard (916), a programming system (915), or any other input device. After receiving the software code, the computer begins to translate the high level language to microcode. The compiler within the computer subsequently recognizes an "if-else" programming construct. The compiler then begins to translate the "if-else" construct using the following steps illustrated in FIG. 22-2.

In a first step, the compiler determines if the "if-else" construct may be optimized for an AE application. If no optimization is possible, the compiler determines if the conditional statement is true. If the conditional statement is true, the compiler provides instructions which will push a current active Vt bit mask on to a stack stored in a register or memory. Note that the term Vt is not meant as a limitation to the present invention, but is intended to encompass any circuit or device within a vector data process which reflects a current state of a processing element. After the current active Vt bit mask is pushed on to a stack, all of the processing elements in which the conditional statement is not true are deactivated. Thus, a new current Vt bit mask is effectively formed.

If the conditional statement is not true, the compiler sets a current Vt bit mask as a logically combination of a current Vt bit mask with a previous Vt bit mask. Then, a first value on the stack is retrieved (or popped) and stored as a current Vt bit mask. The compiler then continues to compile code until a nested conditional construct is reached.

If the nested conditional construct may be optimized for an AE application, a following set of steps are performed. First, the compiler determines if all the processing elements are active in a starting state of operation. If all processing elements are active, a top level push operation may be eliminated and a top-level else may be changed to a simple velse. If all of the processing elements are not active in the starting state of operation, this optimization step may not be executed. Next, the compiler determines if there are any right-hand if-else chains. If there are right-hand if-else chains, then a series of steps illustrated in FIG. 22-3 must be executed.

In a first step of the series illustrated in FIG. 22-3, the Vh bits for all previously active processing elements should be set. Execute a vif instruction and then a velse instruction. Then determine if any more conditional constructs exist in the right-hand if-else chains. If no, repeat execution of the vif and velse instructions. When no more conditional constructs exist in the right-hand if-else chains, then clear all the Vh bits and pop the stack.

After determining whether any right-hand chains exist, determine if there are any solitary "if" nodes. Solitary "if" nodes are nodes that have no corresponding sibling "else" and no child "else" node. If there are solitary "if" statements, eliminate the stack and execute a push or pop of the stack for that state. If there are no solitary "if" statements for optimization, then implement the vif-velse-vendif structure previously specified.

As previously mentioned, an "if" portion of a conditional construct is then executed if the conditional construct determines that an "if" portion of the construct is true. When the "if" portion is executed, a current Vt bit state is pushed onto a stack. In the AE processor, this function may be executed by the instruction "vlshftt V0" when V0 is a vector register in which the state information is being stored. Additionally, if the "if" portion is true, a vif instruction is executed and only the required processing elements (those that satisfy the "if" portion of the construct) are activated.

If the "if" portion is not true, the "else" portion of the construct is executed. During execution of the "else" portion, a current state of the Vt bits is copied into vector register V1 with the instruction "vlshftt V1."

During execution of a vendif instruction, all processing elements are activated during calculation of a new bit mask.

The new bit mask is calculated by logically combining (XOR'ing) a state and a scope to determine a new state. This operation is executed by the instruction "vxor V0, V1." A new state of the Vt bit mask is determined by executing a "vrotrt V1" instruction. An old state of the Vt bit mask is determined by retrieving (popping) an old value off of the stack stored at vector register V0 using the instruction "vrotrt V0."

The prior discussion has disclosed how vector "if-else" constructs introduce space complexities on a system through the requirements of a scope stack in the present invention. Furthermore, the present invention describes the use of a compiler for recognizing special chaining else-if constructs and subsequently efficiently implementing this special case through the use of vif, velse, vendif instructions and the Vt and Vh bit mechanisms. By examining the problems involved in arbitrary "if-else" constructs in theory, the compiler is able to program such constructs on all vector processors, and on the Association Engine data processor. Furthermore, knowledge of existing Association Engine mechanisms also provides various optimizations for the general case explained above. The present invention provides an efficient and effective method for code generation.

Furthermore, it should be noted that the implementation of the invention described herein is provided by way of example only and many other implementations may exist for executing the function described herein. For example, a full hardware implementation which pushes, pops, and logically combines states transparently while executing the vif, velse, and vendif instructions. Additionally, a dedicated hardware bit-stack may be used rather than a vector register.

Association Engine Instruction Set Enhancement for Vector Conditional Operations The present invention describes how a compiler may effectively and efficiently translate arbitrarily nested conditional constructs from a high level programming language to microcode for a vector data processor. Additionally, optimizations which were specific to the Association Engine data processor were disclosed in greater detail. In addition to optimizations for the compiler, the Association Engine may also execute arbitrarily nested conditional constructs more efficiently through an instruction with a mnemonic label of "vnmvh."

When a software program is compiled for the Association Engine data processor, a following sequence of instructions was provided for generally providing a quick method for providing flexible compilations of high level language software programs.

| •If Transition: | vlshftt V0 | ;Push the current Vt bit state onto ;stack |
|---|---|---|
| | vif . . . | ;Perform if test and activate only ;required PE's (creates new state) |
| •Else Transition: | vlshftt V1 | ;Copy current state onto V1 (we ;only care about lsbit) |
| | vendif | ;Set all PE's active during ;calculation of new bit mask |
| | vxor V0, V1 | ;Xor state and scope to determine ;new state (only care about lsbit) |
| | vrotrt V1 | ;Set new state of Vt bits |
| •Endif Transition: | vrotrt V0 | ;Pop scope off of stack |

However, in the code given above, the else transition requires four instructions to implement. Additionally, two vector registers are required to perform the translation operation. The vnmvh instruction manipulates the Vh bits in the Association Engine such that both of these problems are alleviated.

When the "vnmvh Vn" instruction is executed, the least significant bits of the contents of a vector register specified in an operand (Vn) are negated and moved into the VPCR (register 102 of FIG. 4) as Vh bits. When this instruction is executed, all processing elements execute it regardless of a value of a corresponding Vt bit. By using the vnmvh instruction, the following generalized if-else scheme may be implemented by a compiler or programmer of an Association Engine data processor.

| •If Transition: | vlshftt V0 | ;Push the current Vt bit state onto ;stack |
|---|---|---|
| | vif . . . | ;Perform if test and activate only ;required PE's (creates new state) |
| •Else Transition: | vnmvh V0 | ;Lock out the processing elements ;which are not in this scope |
| | velse | ;Perform a velse operation only on ;the processing elements in this ;scope |
| •Endif Transition: | vrotrt V0 | ;Pop scope off of stack |

In the software code provided above, the vnmvh instruction prevents the subsequent velse instruction from activating processing elements which are out of scope of the else clause. An example referred to in FIGS. 20 and 21 will now be considered.

Figure 20:
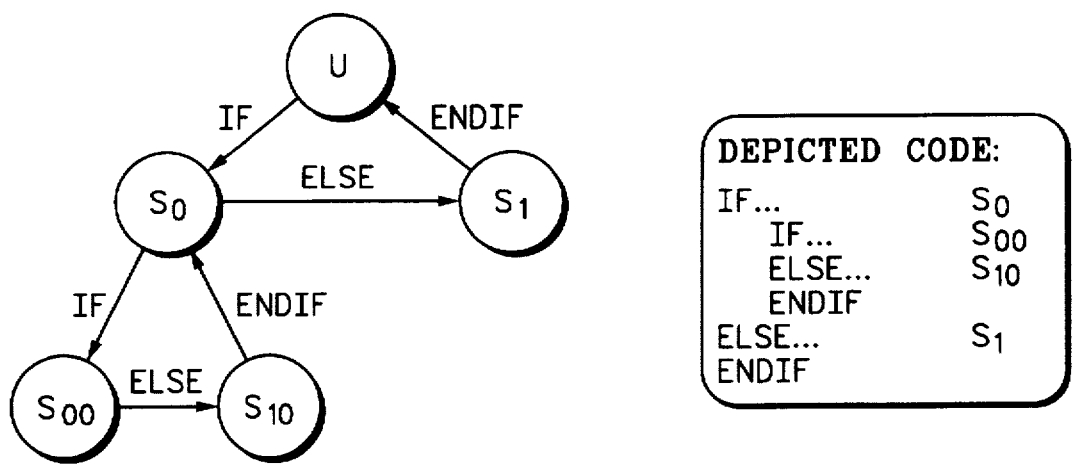
FIG. 20 illustrates in state diagram form a state tree for implementing a portion of software code having nested conditional constructs.

FIG. 20 illustrates a state tree for executing the associated depicted code. FIG. 21 illustrates a next state transition table for vector contents in the vector register V0, the logic state of the Vt bits, and a logic state of the Vh bits. The current Association Engine code required to implement this function is provided below.

| AE Code |
|---|
| vlshftt V0 |
| vif . . . |
| . . . |
| vlshftt V0 |
| vif . . . |
| . . . |
| vendif |
| vlshftt V0 |
| vxor V0, V1 |
| vrotrt V1 |
| . . . |
| vrotrt V0 |
| vendif |
| vlshftt V1 |
| vxor V0, V1 |
| vrotrt V1 |
| . . . |
| vrotrt V0 |
| New AE Code |
| vlshftt V0 |
| vif . . . |
| . . . |
| vlshftt V0 |
| vif . . . |
| . . . |
| vnmvh V0 |
| velse |
| . . . |
| vrotrt V0 |
| vnmvh V0 |
| velse |
| . . . |
| vrotrt V0 |

By using the vnmvh instruction, a substantial number of instructions are removed from the code which programs the Association Engine. FIG. 21 provides a transition table for execution of the New AE Code. In FIG. 21, note that in column U, an initial state, all processing elements (PE[0] through PE[6]) are activated. In state S0, only processing elements 0 through 3 satisfy the first "if" portion of the conditional construct. In State S00, only processing elements 0 and 1 satisfy the second "if" portion of the conditional construct. In state S10, only processing elements 2 and 3 satisfy the second "then" portion of the conditional construct. In state S1, only processing elements 4 through 6 satisfy the first "then" portion of the conditional construct.

After the first vlshftt V0 and vif instructions, vector register V0 stores a logic one in a lowest bit of each byte corresponding to an active processing element. Note vector register V0 stores a state of the conditional construct and indicates that all processing elements are activated. After the vlshftt V0 and vif instructions, the Vt bits associated with the processing elements which satisfy the first "if" portion of the conditional construct are asserted. The Vh bits will be used to prevent processing elements from participating during a velse instruction. As such, they remain unchanged until we reach an "else" transition.

After the second vlshftt V0 and vif instructions, the contents of vector register V0 are shifted to the left. Additionally, the Vt bits of the previous state are stored in the lowest bit of each byte corresponding to the processing elements. After the vlshftt V0 and vif instructions, the Vt bits associated with the processing elements which satisfy the second "if" portion of the conditional construct are asserted.

The vnmvh V0 and velse instructions are subsequently executed in the current example. Note that when the vnmvh V0 signal is executed, all processing elements participate regardless of a setting of the Vt bit. When the vnmvh V0 instruction is executed, the least significant bits of vector register V0 are negated and moved into the Vh bits. Thus, the Vh bits have a value of 0000111 for processing elements 0 through 6. This value places logic one values in the Vh bits for those processing elements that were not active in state S0. This prevents those processing elements from participating in the subsequent "velse" instruction which establishes state S10. When the else instruction is executed, several actions may occur. For example, if the Vh bit is set, then the processing element is left as is. Otherwise, if the Vt bit is set, the processing element is deactivated (Vt is set to 0) and the Vh bit is set. If neither the Vt or Vh bits are set, then the processing element is activated and the Vt bit is set to 1. Therefore, after the velse instruction is executed, PE[0] and PE[1] have a Vt bit of 0 and a Vh bit of 1. PE[2] and PE[3] have a Vt bit of 0 and a Vh bit of 1. Because the Vt bit was set to 0 and the Vh bit was set to 1, PE[4] through PE[6] were left as is.

A remaining portion of the transition table illustrated in FIG. 21 use the vnmvh instruction to execute a nested conditional construct efficiently and effectively. The next transition is the "endif" transition from state S10 back to state S0. This is easily done by popping the stack (vrotrt V0). Then, the "else" transition from state S0 to state S1 is executed. After the vrotrt V0 instruction, the Vt bits and the low-order bits of V0 are identical to that illustrated in column 1 of the table illustrated in FIG. 21. A next vnmvh V0 instruction places logic one values in all the Vh bits of the processing elements not active in state U. In this case, no processing elements satisfy this condition so the Vh bits will all be a logic zero value. This is because an execution flow is at a top-most "else" instruction (as previously mentioned, this execution flow may be optimized). The "velse" instruction then appropriately establishes state S1. Finally, a last vrotrt V0 instruction restores an initial Vt state.

While the present invention has been shown and described with reference to particular embodiments thereof, various modifications and changes thereto will be apparent to one skilled in the art and are within the spirit and scope of the present invention.

We claim:

1. A method for compiling a nested conditional construct for a vector data processor, comprising the computer-implemented steps of:

providing a first program for the vector data processor in a first software language, the program including the nested conditional construct;

initiating translation of the first program for the vector data processor from the first software language to a second program in a second software language by a data processor;

recognizing the nested conditional construct in the first program;

translating a first portion of the first program for the vector data processor from the first software language to a first portion of the second program in the second software language, the first portion of the second program determining when a condition in the nested conditional construct is true and when the condition in the nested conditional construct is false;

providing a second portion of the second program wherein a first vector instruction set stores a first state of each of a plurality of processing elements of the vector data processor in a first vector register when the condition in the nested conditional construct is true;

providing a third portion of the second program wherein a second vector instruction set deactivates each of the plurality of processing elements for which the nested conditional construct is false;

providing a fourth portion of the software program wherein a third vector instruction set which logically combines a second state of each of the plurality of processing elements with the first state of each of the plurality of processing elements of the vector data processor; and providing a fifth portion of the software program wherein a fourth vector instruction set retrieves a first register value from the first vector register to provide a third state for each of the plurality of processing elements of the vector data processor.

2. The method for compiling of claim 1 wherein the first vector register is used as a stack for a state of each of the plurality of processing elements.

3. The method of compiling of claim 1 wherein the second software language is a microcode language for the vector data processor.

4. The method of compiling of claim 1 wherein the first vector instruction set, comprises:

a vector shift instruction for shifting the first state of each of the plurality of processing elements of the vector data processor in the first vector register.

5. The method of compiling of claim 1 wherein the second vector instruction set, comprises:

a vector conditional instruction for activating a first portion of the plurality of processing elements when the condition in the nested conditional construct is true.

6. The method of claim 1 wherein the third vector instruction set, comprises:

a first vector shift instruction for shifting the first state of each of the plurality of processing elements of the vector data processor in a second vector register;

a vector conditional instruction which activates each of the plurality of processing elements when the second state of each of the plurality of processing elements is logically combined with the first state of each of the plurality of processing elements of the vector data processor;

a vector exclusive OR instruction which logically combines the second state of each of the plurality of processing elements with the first state of each of the plurality of processing elements of the vector data processor and stores a result in the second vector register; and a second vector shift instruction which accesses the result in the second vector register to determine a new state of the plurality of processing elements of the vector data processor.

7. The method of claim 1 wherein the fourth vector instruction set, comprises:

a vector rotate instruction for rotating the first state of each of the plurality of processing elements of the vector data processor from the first vector register to provide a current state of the plurality of processing elements of the vector data processor.

8. A method for compiling a nested conditional construct for a vector data processor, comprising the computer-implemented steps of:

providing a first program for the vector data processor in a first software language, the program including the nested conditional construct;

initiating translation of the first program for the vector data processor from the first software language to a second program in a second software language by a data processor;

recognizing the nested conditional construct in the first program;

enabling the data processor to determine if the nested conditional construct may be optimized for the vector data processor;

translating the first program for the vector data processor from the first software language to the second program in the second software language in a first set of steps when the nested conditional construct may not be optimized, the first set of steps comprising the steps of:

translating a first portion of the first program for the vector data processor from the first software language to a first portion of the second program in the second software language, the first portion of the second program determining when a condition in the nested conditional construct is true and when the condition in the nested conditional construct is false;

providing a second portion of the second program wherein a first vector instruction set stores a first state of each of a plurality of processing elements of the vector data processor in a first vector register when the condition in the nested conditional construct is true;

providing a third portion of the second program wherein a second vector instruction set deactivates each of the plurality of processing elements for which the nested conditional construct is false;

providing a fourth portion of the software program wherein a third vector instruction set which logically combines a second state of each of the plurality of processing elements with the first state of each of the plurality of processing elements of the vector data processor; and providing a fifth portion of the software program wherein a fourth vector instruction set retrieves a first register value from the first vector register to provide a third state for each of the plurality of processing elements of the vector data processor;

translating the first program for the vector data processor from the first software language to the second program in the second software language in a second set of steps when the nested conditional construct may be optimized, the second set of steps comprising the steps of:

determining when each of the plurality of processing elements is active in the first state;

translating a sixth portion of the software program wherein a fifth vector instruction set programs the vector data processor to execute a first optimized function when each of the plurality of processing elements is active in the first state;

determining when a nested conditional construct is a predetermined nested conditional construct form which may be optimized when each of the plurality of processing elements is not active in the first state; and translating a seventh portion of the software program wherein a sixth vector instruction set programs the vector data processor to execute a second optimized function when the nested conditional construct is the predetermined nested conditional construct form.

9. The method of claim 8 wherein the first optimized function comprises the steps of:

receiving a first instruction;

decoding the first instruction to provide a first plurality of control signals;

accessing an enable value from an enabled one of the plurality of processing elements in response to a first portion of the plurality of control signals, the enable value selectively enabling the enabled one of the plurality of processing elements to participate in execution of the first instruction and indicating the first state of each of the plurality of processing elements;

accessing a history value from the enabled one of the plurality of processing elements in response to a second portion of the plurality of control signals;

selectively modifying the enable value in response to a logic state of the history value;

accessing a plurality of enable values from each of an enabled portion of the plurality of processing elements in response to the first portion of the plurality of control signals, each of the plurality of enable values selectively enabling a corresponding one of the plurality of processing elements to participate in execution of the first instruction;

accessing a plurality of history values from each of the enabled portion of the plurality of processing elements in response to the second portion of the plurality of control signals, each of the plurality of history values corresponding to one of the enabled portions of the plurality of processing elements; and selectively modifying each of the plurality of enable values in response to a logic state of a corresponding one of the plurality of history values.

10. The method of claim 8 wherein the predetermined nested conditional construct form which may be optimized is a right-hand conditional chain.

11. The method of claim 10 further comprising the steps of:

setting a plurality of history bits which correspond to a plurality of processing elements which were previously active;

executing a first vector conditional operation, the first vector conditional operation comprising the steps of:
  receiving a first instruction;
  decoding the first instruction to provide a first plurality of control signals;
  accessing an enable value corresponding to a processing element in response to a first portion of the first plurality of control signals;
  selectively enabling the processing element to participate in execution of the first instruction when the enable value is in an asserted state;
  executing a comparison operation in response to a second portion of the plurality of control signals, the processing element being used during execution of the comparison operation when the processing element is enabled to participate;
  selectively negating the enable value corresponding to the processing element when the processing element is enabled to participate, the enables value being negated when the condition of the comparison operation has not been met;
  accessing the plurality of enable values from each of the plurality of processing elements in response to a first portion of the second plurality of control signals;
  selectively enabling a portion of the plurality of processing elements to participate in execution of the first instruction, each of the portion of the plurality of processing elements having an enable value in an asserted state;
  executing a comparison operation in response to a second portion of the plurality of control signals, each of the portion of the plurality of processing elements being used during execution of the comparison operation; and
  selectively negating each of a portion of the plurality of enable values corresponding to the portion of the plurality of processing elements when the condition of the comparison operation has not been met; and executing a second vector conditional operation, the second vector conditional operation comprising the steps of:
  receiving a second instruction;
  decoding the second instruction to provide a second plurality of control signals;
  accessing an enable value from an enabled one of the plurality of processing elements in response to a first portion of the plurality of control signals, the enable value selectively enabling the enabled one of the plurality of processing elements to participate in execution of the second instruction and indicating the first state of each of the plurality of processing elements;
  accessing a history value from the enabled one of the plurality of processing elements in response to a second portion of the plurality of control signals;
  selectively modifying the enable value in response to a logic state of the history value;
  accessing a plurality of enable values from each of an enabled portion of the plurality of processing elements in response to the first portion of the plurality of control signals, each of the plurality of enable values selectively enabling a corresponding one of the plurality of processing elements to participate in execution of the second instruction;
  accessing a plurality of history values from each of the enabled portion of the plurality of processing elements in response to the second portion of the plurality of control signals, each of the plurality of history values corresponding to one of the enabled portions of the plurality of processing elements;
  selectively modifying each of the plurality of enable values in response to a logic state of a corresponding one of the plurality of history values;
  negating the plurality of history bits of each of the plurality of processing elements; and
  executing a vector rotate instruction for rotating the first state of each of the plurality of processing elements of the vector data processor from the first vector register to provide a current state of the plurality of processing elements of the vector data processor.

12. The method of claim 8 wherein the predetermined nested conditional construct form which may be optimized is a solitary-if chain which only includes an if conditional construct.

13. The method of compiling of claim 8 wherein the second software language is a microcode language for the vector data processor.

14. The method of compiling of claim 8 wherein the first vector instruction set, comprises:
  a vector shift instruction for shifting the first state of each of the plurality of processing elements of the vector data processor in the first vector register.

15. The method of compiling of claim 8 wherein the second vector instruction set, comprises:
  a vector conditional instruction for activating a first portion of the plurality of processing elements when the condition in the nested conditional construct is true.

16. The method of claim 8 wherein the third vector instruction set, comprises:
  a first vector shift instruction for shifting the first state of each of the plurality of processing elements of the vector data processor in a second vector register;
  a vector conditional instruction which activates each of the plurality of processing elements when the second state of each of the plurality of processing elements is logically combined with the first state of each of the plurality of processing elements of the vector data processor;
  a vector exclusive OR instruction which logically combines the second state of each of the plurality of processing elements with the first state of each of the plurality of processing elements of the vector data processor and stores a result in the second vector register; and
  a second vector shift instruction which accesses the result in the second vector register to determine a new state of the plurality of processing elements of the vector data processor.

17. The method of claim 16 wherein the fourth vector instruction set, comprises:
  a vector rotate instruction for rotating the first state of each of the plurality of processing elements of the vector data processor from the first vector register to provide a current state of the plurality of processing elements of the vector data processor.

18. A method for compiling a nested conditional construct for a vector data processor, comprising the computer-implemented steps of:
  providing a first program for the vector data processor in a first software language, the program including the nested conditional construct;

initiating translation of the first program for the vector data processor from the first software language to a second program in a second software language by a data processor;

recognizing the nested conditional construct in the first program;

enabling the data processor to determine if the nested conditional construct may be optimized for the vector data processor;

translating the first program in the first software language to the second program in the second software language using a general vector conditional construct program; and optimizing a translation of the first program to the second program such that the first program in the first software language is translated to the second program in the second software language using an optimized vector conditional construct program.

19. The method of claim 18 wherein the general vector conditional construct program, comprises the steps of:

translating the first program for the vector data processor from the first software language to the second program in the second software language in a first set of steps when the nested conditional construct may not be optimized, the first set of steps comprising the steps of:

translating a first portion of the first program for the vector data processor from the first software language to a first portion of the second program in the second software language, the first portion of the second program determining when a condition in the nested conditional construct is true and when the condition in the nested conditional construct is false;

providing a second portion of the second program wherein a first vector instruction set stores a first state of each of a plurality of processing elements of the vector data processor in a first vector register when the condition in the nested conditional construct is true;

providing a third portion of the second program wherein a second vector instruction set deactivates each of the plurality of processing elements for which the nested conditional construct is false;

providing a fourth portion of the software program wherein a third vector instruction set which logically combines a second state of each of the plurality of processing elements with the first state of each of the plurality of processing elements of the vector data processor; and providing a fifth portion of the software program wherein a fourth vector instruction set retrieves a first register value from the first vector register to provide a third state for each of the plurality of processing elements of the vector data processor.

20. The method of claim 19 wherein the optimized vector conditional construct program comprises the steps of:

determining when each of the plurality of processing elements is active in the first state; and translating a sixth portion of the software program wherein a fifth vector instruction set programs the vector data processor to execute a first optimized function when each of the plurality of processing elements is active in the first state.

21. The method of claim 20 wherein the first optimized function comprises the steps of:

receiving a first instruction;

decoding the first instruction to provide a first plurality of control signals;

accessing an enable value from an enabled one of the plurality of processing elements in response to a first portion of the plurality of control signals, the enable value selectively enabling the enabled one of the plurality of processing elements to participate in execution of the first instruction and indicating the first state of each of the plurality of processing elements;

accessing a history value from the enabled one of the plurality of processing elements in response to a second portion of the plurality of control signals;

selectively modifying the enable value in response to a logic state of the history value;

accessing a plurality of enable values from each of an enabled portion of the plurality of processing elements in response to the first portion of the plurality of control signals, each of the plurality of enable values selectively enabling a corresponding one of the plurality of processing elements to participate in execution of the first instruction;

accessing a plurality of history values from each of the enabled portion of the plurality of processing elements in response to the second portion of the plurality of control signals, each of the plurality of history values corresponding to one of the enabled portions of the plurality of processing elements; and selectively modifying each of the plurality of enable values in response to a logic state of a corresponding one of the plurality of history values.

22. The method of claim 19 wherein the optimized vector conditional construct program comprises the steps of:

determining when a nested conditional construct is a predetermined nested conditional construct form which may be optimized; and translating a seventh portion of the software program wherein a sixth vector instruction set programs the vector data processor to execute a second optimized function when the nested conditional construct is the predetermined nested conditional construct form.

23. The method of claim 22 wherein the predetermined nested conditional construct form which may be optimized is a right-hand conditional chain.

24. The method of claim 23 further comprising the steps of:

setting a plurality of history bits which correspond to a plurality of processing elements which were previously active;

executing a first vector conditional operation, the first vector conditional operation comprising the steps of:

receiving a first instruction;

decoding the first instruction to provide a first plurality of control signals;

accessing an enable value corresponding to a processing element in response to a first portion of the first plurality of control signals;

selectively enabling the processing element to participate in execution of the first instruction when the enable value is in an asserted state;

executing a comparison operation in response to a second portion of the plurality of control signals, the processing element being used during execution of the comparison operation when the processing element is enabled to participate;

selectively negating the enable value corresponding to the processing element when the processing element is enabled to participate, the enables value being negated when the condition of the comparison operation has not been met;

accessing the plurality of enable values from each of the plurality of processing elements in response to a first portion of the second plurality of control signals;

selectively enabling a portion of the plurality of processing elements to participate in execution of the first instruction, each of the portion of the plurality of processing elements having an enable value in an asserted state;

executing a comparison operation in response to a second portion of the plurality of control signals, each of the portion of the plurality of processing elements being used during execution of the comparison operation; and selectively negating each of a portion of the plurality of enable values corresponding to the portion of the plurality of processing elements when the condition of the comparison operation has not been met; and executing a second vector conditional operation, the second vector conditional operation comprising the steps of:

receiving a second instruction;

decoding the second instruction to provide a second plurality of control signals;

accessing an enable value from an enabled one of the plurality of processing elements in response to a first portion of the plurality of control signals, the enable value selectively enabling the enabled one of the plurality of processing elements to participate in execution of the second instruction and indicating the first state of each of the plurality of processing elements;

accessing a history value from the enabled one of the plurality of processing elements in response to a second portion of the plurality of control signals;

selectively modifying the enable value in response to a logic state of the history value;

accessing a plurality of enable values from each of an enabled portion of the plurality of processing elements in response to the first portion of the plurality of control signals, each of the plurality of enable values selectively enabling a corresponding one of the plurality of processing elements to participate in execution of the second instruction;

accessing a plurality of history values from each of the enabled portion of the plurality of processing elements in response to the second portion of the plurality of control signals, each of the plurality of history values corresponding to one of the enabled portions of the plurality of processing elements;

selectively modifying each of the plurality of enable values in response to a logic state of a corresponding one of the plurality of history values;

negating the plurality of history bits of each of the plurality of processing elements; and executing a vector rotate instruction for rotating the first state of each of the plurality of processing elements of the vector data processor from the first vector register to provide a current state of the plurality of processing elements of the vector data processor.

25. The method of claim 22 wherein the predetermined nested conditional construct form which may be optimized is a solitary-if chain which only includes an if conditional construct.

* * * * *